United States Patent
Repasi et al.

(10) Patent No.: US 7,877,806 B2
(45) Date of Patent: Jan. 25, 2011

(54) REAL TIME MALICIOUS SOFTWARE DETECTION

(75) Inventors: Rolf Repasi, Sunrise Beach (AU); Simon Clausen, New South Wales (AU); Ian Oliver, New South Wales (AU); Ryan Pereira, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 850 days.

(21) Appl. No.: 11/829,608

(22) Filed: Jul. 27, 2007

(65) Prior Publication Data

US 2008/0028469 A1    Jan. 31, 2008

Related U.S. Application Data

(60) Provisional application No. 60/833,858, filed on Jul. 28, 2006.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 11/30* | (2006.01) |

(52) U.S. Cl. ............................. 726/23; 726/22; 726/25; 713/188

(58) Field of Classification Search ....................... None
See application file for complete search history.

(56) References Cited

U.S. PATENT DOCUMENTS

| | | | |
|---|---|---|---|
| 6,973,577 B1 * | 12/2005 | Kouznetsov | 726/25 |
| 7,093,239 B1 * | 8/2006 | van der Made | 717/135 |
| 2005/0154900 A1 * | 7/2005 | Muttik | 713/188 |
| 2005/0289649 A1 * | 12/2005 | Mitomo et al. | 726/22 |
| 2006/0141985 A1 * | 6/2006 | Patel et al. | 455/410 |
| 2006/0230451 A1 * | 10/2006 | Kramer et al. | 726/22 |
| 2006/0259967 A1 * | 11/2006 | Thomas et al. | 726/22 |
| 2007/0271611 A1 * | 11/2007 | Kwan | 726/22 |

\* cited by examiner

*Primary Examiner*—Shin-Hon Chen
(74) *Attorney, Agent, or Firm*—Holland & Hart LLP

(57) ABSTRACT

A method, system, computer program product and/or computer readable medium of instructions for detecting malicious software, comprising intercepting a request to perform an activity in a processing system; determining an entity associated with the activity, wherein the entity comprises at least one of: a requesting entity of the activity; and a target entity of the activity; analysing the entity and the activity to determine if the request is associated with malicious software; and in the event that the request is determined to be associated with malicious software, restricting the request to perform the activity in the processing system.

15 Claims, 26 Drawing Sheets

2430

| | FREQUENCY | | |
|---|---|---|---|
| NUMBER OF RELATED ENTITIES | Infrequent | Frequent | Very Frequent |
| Low No. of related entities | 0 | 0 | 0 |
| Medium No. of related entities | 0.6 | 0.25 | 0 |
| High No. of related entities | 0.25 | 0.25 | 0 |

FIGURE 24E

REAL TIME MALICIOUS SOFTWARE DETECTION

This application claims the benefit of priority from U.S. Provisional Patent Application No. 60/833,858 filed Jul. 28, 2006, and is incorporated by referenced.

TECHNICAL FIELD

The present invention generally relates to a method, system, computer readable medium of instructions and/or computer program product for detecting malicious activity in a processing system.

BACKGROUND ART

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process, as used herein, is at least one of a running software program or other computing operation, or a part of a running software program or other computing operation, that performs a task.

A hook chain as used herein, is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

A system registry is a database used by operating systems, for example Windows™ platforms. The system registry comprises information needed to configure the operating system. The operating system refers to the registry for information ranging from user profiles, to which applications are installed on the machine, to what hardware is installed and which ports are registered.

An entity can comprise, but is not limited to, a file, an object, a class, a collection of grouped data, a library, a variable, a process, and/or a device.

There are currently a number of techniques which can be used to detect malicious software in a processing system.

One technique comprises using database driven malicious software techniques which detect known malicious software. In this technique, a database is used which generally comprises a signature indicative of a particular type of malicious software. However, this technique suffers from a number of disadvantages. Generating and comparing signatures for each entity in a processing system to the database can be a highly process-intensive task. Other applications can be substantially hampered or can even malfunction during this period of time when the detection process is performed. Furthermore, this technique can only detect known malicious software. If there is no signature in the database for a new type of malicious software, malicious activity can be performed without the detection of the new type of malicious software.

Therefore, there exists a need for a method, system, computer readable medium of instructions, and/or a computer program product which can more effectively detect malicious activity in a processing system which addresses or at least ameliorates at least one of the problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In a first broad form there is provided a method of detecting malicious software, wherein the method comprises:

intercepting a request to perform an activity in a processing system;

determining an entity associated with the activity, wherein the entity comprises at least one of:

a requesting entity of the activity; and a target entity of the activity;

analysing the entity and the activity to determine if the request is associated with malicious software; and in the event that the request is determined to be associated with malicious software, restricting the request to perform the activity in the processing system.

In one form, the method comprises:

recording one or more previously intercepted activities in a list;

analysing the activity by:

obtaining one or more intercepted activities from the list;

comparing the activity and the one or more intercepted activities to a sequence of known malicious activities; and in the event of a positive comparison, determining that the activity is associated with malicious software.

In another form, the method comprises:

filtering, using a filter module, the activity according to determine if the activity is suspicious; and in the event that the activity is determined to be suspicious, performing the analysis to determine if the request is associated with malicious software.

In one particular form, the filter module comprises a list of filter rules to determine if at least one of the target entity and the requesting entity are suspicious or non-suspicious, wherein the method comprises determining an order of the list according to a frequency of instances each filter rule has been previously satisfied, wherein the filter module is used at least partially based on the determined order.

In another particular form, the filter module comprises a list of susceptible target entity filter rules, wherein the step of determining if the activity is suspicious comprises determining if the target entity satisfies one of the susceptible target entity filter rules, and in response to one of the susceptible target entity filter rules being satisfied, the activity is identified as being suspicious.

In an optional form, the filter module comprises a list of non-susceptible target entity filter rules, wherein the step of determining if the activity is non-suspicious comprises determining if the target entity satisfies one of the non-susceptible target entity filter rules, and in response to one of the non-susceptible target entity filter rules being satisfied, the activity is identified as being non-suspicious.

In another optional form, the filter module comprises a list of non-trusted requesting entity filter rules, wherein the step of determining if the activity is suspicious comprises determining if the requesting entity satisfies one of the non-trusted requesting entity filter rules, and in response to one of the non-trusted requesting entity filter rules being satisfied, the activity is identified as being suspicious.

Optionally, the filter module comprises a list of trusted requesting entity filter rules, wherein the step of determining if the activity is non-suspicious comprises determining if the requesting entity satisfies one of the non-trusted requesting entity filter rules, and in response to one of the non-trusted requesting entity filter rules being satisfied, the activity is identified as being non-suspicious.

In one embodiment, analysing the activity comprises:

determining an entity threat value for the entity, the entity threat value being indicative of a level of threat that the entity represents to the processing system, wherein the entity threat value is determined based on one or more characteristics of the entity; and comparing the entity threat value to an entity threat threshold determine if the request is associated with malicious software.

In another embodiment, each of the one or more characteristics of the entity is associated with a respective characteristic threat value, wherein the method comprises calculating the entity threat value using at least some of the characteristic threat values for the one or more characteristics of the entity.

In one aspect, the method comprises:

determining one or more related entities to the entity, wherein each related entity has an associated entity threat value; and, calculating the entity threat value for the entity using the entity threat value for at least some of the one or more related entities.

In another aspect, the method comprises:

determining one or more related entities to the entity, wherein each related entity has an associated entity threat value; and, calculating a group threat value for the entity and one or more related entities using the entity threat value for at least some of the one or more related entities and the entity.

In one optional form, the method comprises:

analysing the activity comprises:

determining one or more values indicative of an entity; and performing a fuzzy logic analysis in relation to the one or more values to determine if the request is associated with malicious software.

In another optional form, the one or more values can comprise at least one of:

an entity threat value;

a group threat value;

a frequency of an event occurring;

a number of related entities to the entity; and a number of child processes created by the entity.

In a second broad form there is provided a system to detect malicious software, wherein the system is configured to:

intercept a request to perform an activity in a processing system;

determine at least one of:

a requesting entity of the activity; and a target entity of the activity;

analyse at least one of the requesting entity, the target entity and the action to determine if the activity is associated with malicious software; and restrict the request to perform the activity in the processing system in the event that the request is determined to be associated with malicious software.

In a third broad form there is provided a computer program product comprising a computer readable medium having a computer program recorded therein or thereon, the computer program enabling detection of malicious software, wherein the computer program product configures the processing system to:

intercept a request to perform an activity in a processing system;

determine at least one of:

a requesting entity of the activity; and a target entity of the activity;

analyse at least one of the requesting entity, the target entity and the action to determine if the activity is associated with malicious software; and restrict the request to perform the activity in the processing system in the event that the request is determined to be associated with malicious software.

According to another broad form, the present invention provides a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

FIGS. 24A, 24B, 24C, 24D and 24E represent an example of detecting malicious activity using fuzzy logic.

MODES FOR CARRYING OUT THE INVENTION

Figure 1:
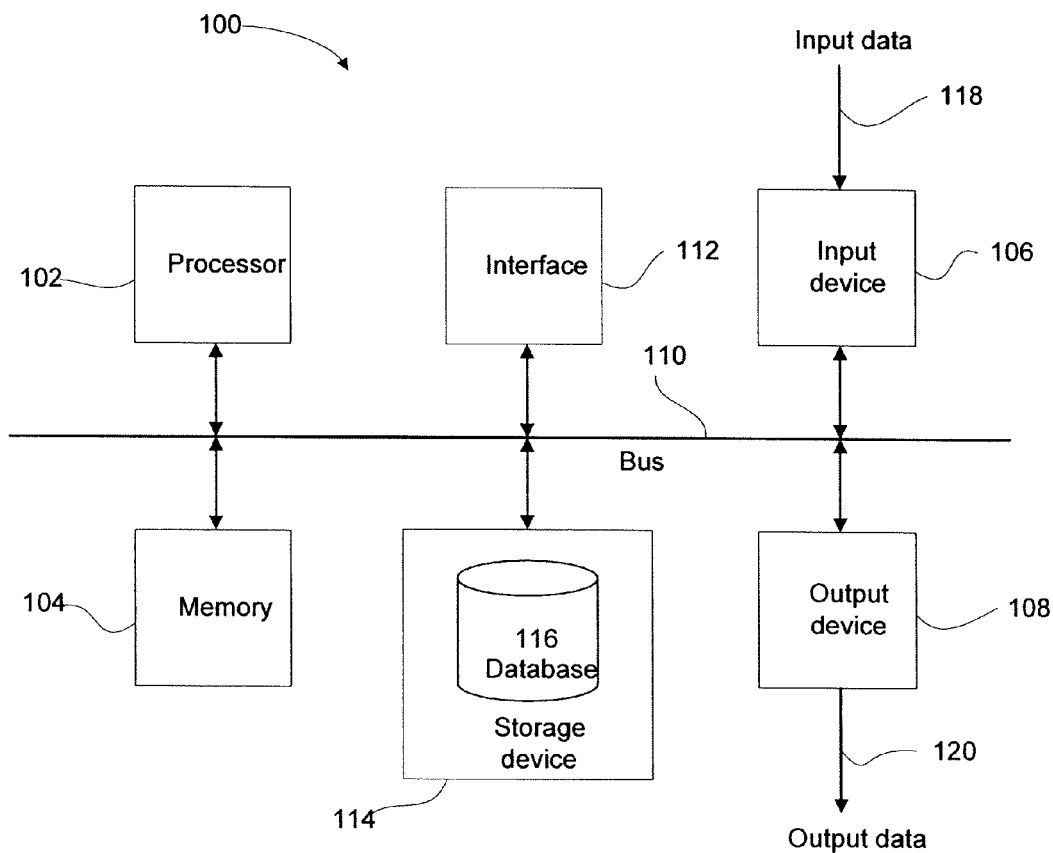
FIG. 1 illustrates a functional block diagram of an example of a processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1. The processing system 100 illustrated in relation to FIG. 1 can be used as a client processing system 810 and/or a server processing system 840.

In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

The processing system 100 may be a part of a networked communications system. The processing system 100 could connect to network, for example the Internet or a WAN. The network can comprise one or more client processing systems 810 and one or more server processing systems 840 (refer to FIG. 8), wherein the one or more client processing systems 810 and the one or more server processing systems 840 are forms of processing system 100. Input data 118 and output data 120 could be communicated to other devices via the network. The transfer of information and/or data over the network can be achieved using wired communications means or wireless communications means. The server processing system 840 can facilitate the transfer of data between the network and one or more databases. The server processing system 840 and one or more databases provide an example of an information source.

Figure 2:
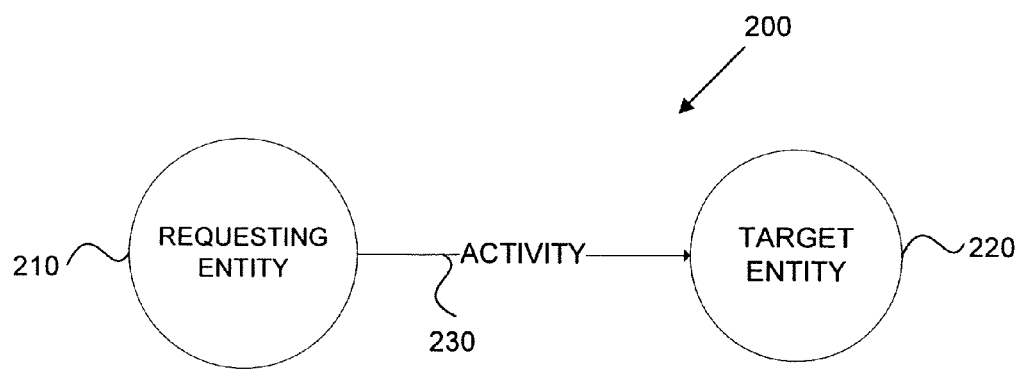
FIG. 2 illustrates a block diagram illustrating the relationship between a requesting entity and a target entity.

Referring to FIG. 2, there is shown a block diagram illustrating a request 200. Generally, the request 200 comprises an activity 230, a target entity 220 and a requesting entity 210. In particular, the requesting entity 210 causes the activity 230 to be performed in relation to the target entity 220.

For example, an executable object in a processing system 100 may request 200 to download data from a web-site on the Internet. In this example, the executable object would be considered the requesting entity 210, the activity 230 would be considered the act of downloading data, and the target entity 220 would be the web-site on the Internet. The requesting entity 210 is a starting point in the processing system 810, or network of processing systems 100, which requests 200 the action 230 to be performed, and the target entity 220 is an end point in the processing system 100, or network of processing systems 100, which the action 230 is performed in relation to.

As will be described in more detail, an request 200 is analysed to determine at least one of the requesting entity 210 and the target entity 220. By determining at least one of the requesting entity 210 and the target entity 220, an accurate and efficient process of detecting malicious software in a processing system 100 can be performed.

Figure 3:
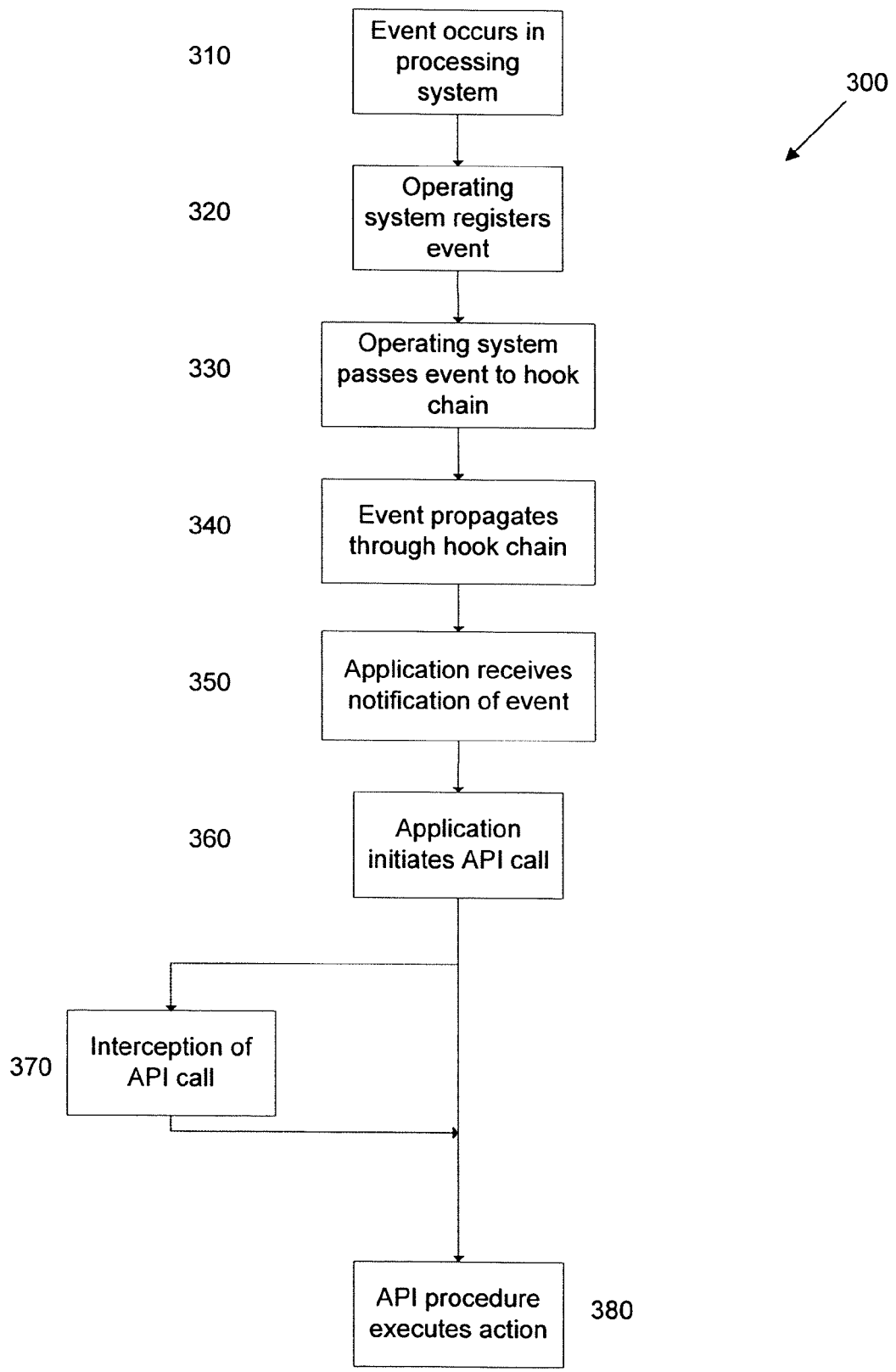
FIG. 3 illustrates a flow diagram of an example method of intercepting an activity in a processing system.

Referring to FIG. 3 there is shown an example of a method 300 of intercepting an activity in a processing system 100.

At step 310, an event occurs in the processing system 100. The event can be a request 200 by a requesting entity 210 to perform an action 230 in relation to a target entity 220. At step 320, an operating system running in the processing system 100 registers the occurrence of the event. At step 330, the operating system passes the registered event to the hook chain. At step 340, the event is passed to each hook in the hook chain such that different applications, processes, and devices may be notified of the registered event. Once the event has propagated throughout the hook chain, the method 300 comprises at step 350 an application receiving notification of the event being registered by the processing system 100.

At step 360, the method 300 comprises the application initiating an API call to an API procedure so as to carry out a response to the registered event, wherein the response may be the execution of the action 230 in relation to the target entity 220. If an API hook has been established between the API call and the API procedure, the API call is intercepted before it reaches the API procedure at step 370. Processing can be performed by an API hook function once the API call has been intercepted prior to the API procedure being called. The API call may be allowed to continue calling the API procedure at step 380 such that the action 230 is performed in relation to the target entity 220.

Figure 4A:
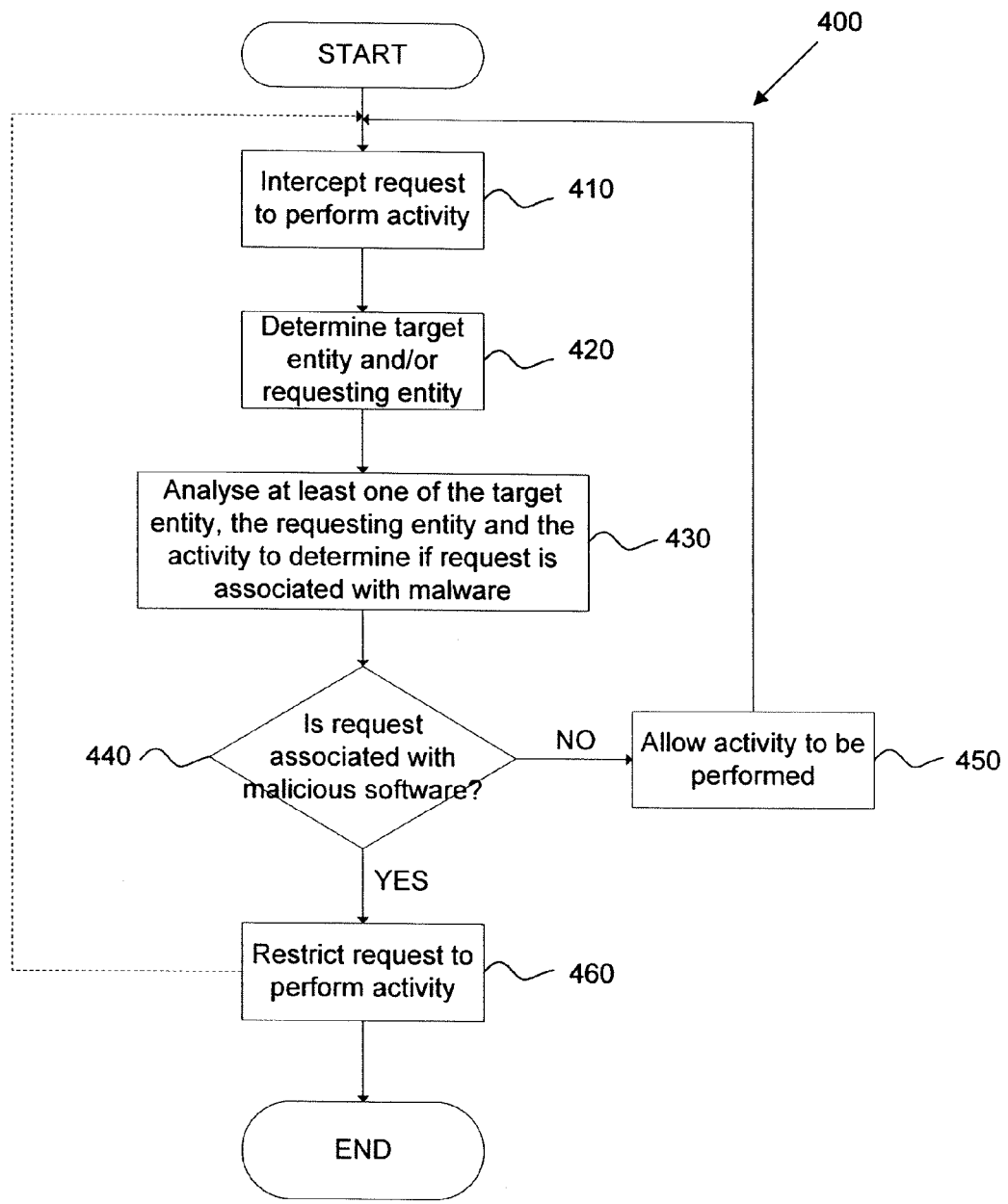
FIG. 4A illustrates a flow diagram of an example method of detecting malicious activity.

Referring to FIG. 4A, there is shown a method 400 of detecting malicious software. At step 410, the method 400 comprises intercepting a request 200 to perform an activity 230 in the processing system 100. At step 420 the method 400 comprises determining at least one of the requesting entity 210 associated with the activity 230, and the target entity associated with the activity 230. At step 430 and 440, the method 400 comprises analysing at least one of the requesting entity 210, the target entity 220 and the activity 230 to determine if the request 200 is associated with malicious software. In the event that the request 200 is determined to be associated with malicious software, the method 400 comprises restricting the request 200 to perform the activity 230 in the processing system 100 at step 460. In the event that the request 200 is not associated with malicious software, the method proceeds to step 450 which comprises allowing the request 200 to perform the activity 230 in the processing system 100.

Figure 4B:
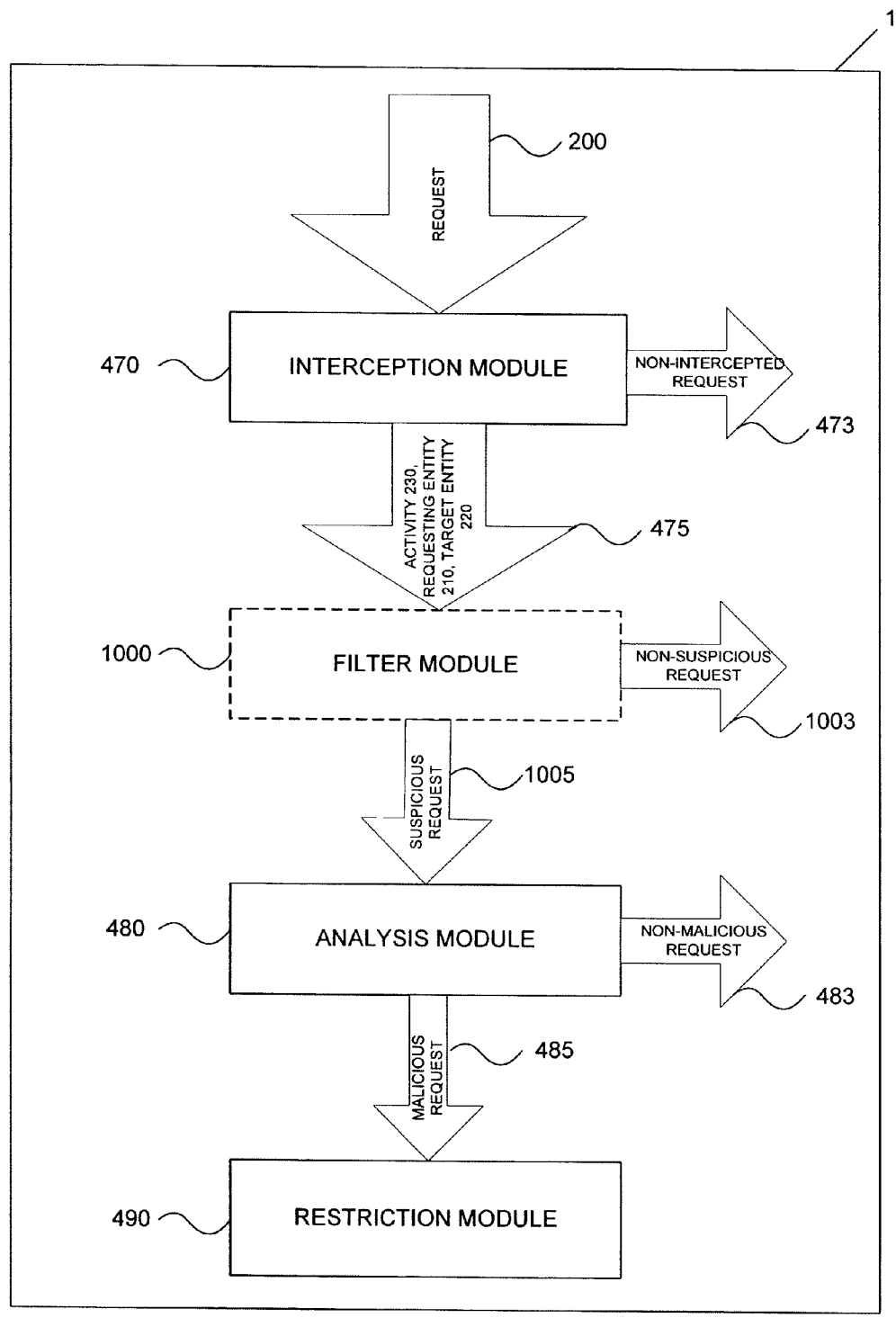
FIG. 4B illustrates a block diagram illustrating a system to detect malicious activity.

Referring now to FIG. 4B there is shown a system 1 to detect malicious software. In particular, at least some requests 200 to perform an activity 230 in the processing system 100 are intercepted by an interception module 470 using the technique outlined in FIG. 3. The intercepted requests 200 are then analysed to determine at least one of the requesting entity 210 and the target entity 220 and the activity 230. The results can optionally be passed onto the filter module 1000, as will be explained in more detail later, or can be passed to an analysis module 480 to analyse at least one of the requesting entity 210, the target entity 220, and the activity 230 of the request to determine whether the request 200 is malicious. Malicious requests 485 are restricted by a restriction module 490. As will be explained in more detail, the restriction module 490 can perform a number of different processes in order to restrict the request 200 being performed, as well as restricting similar future requests being performed in the processing system 100.

The method 400 and system 1 advantageously allow the detection of the malicious software prior to the malicious activity 485 being performed in the processing system 100 (ie. real time detection), thus restricting the processing system 100 being compromised.

The system 1 can be implemented in a single processing system 100. Alternatively, as will be discussed in more detail below, the system 1 can be implemented using one or more client processing systems 810 and one or more server processing systems 840 (referred to as a 'distributed system'). In this form, the system 1 determines whether there is a request to perform an activity 230 which is associated with malicious software in the one or more client processing systems 810.

Figure 5:
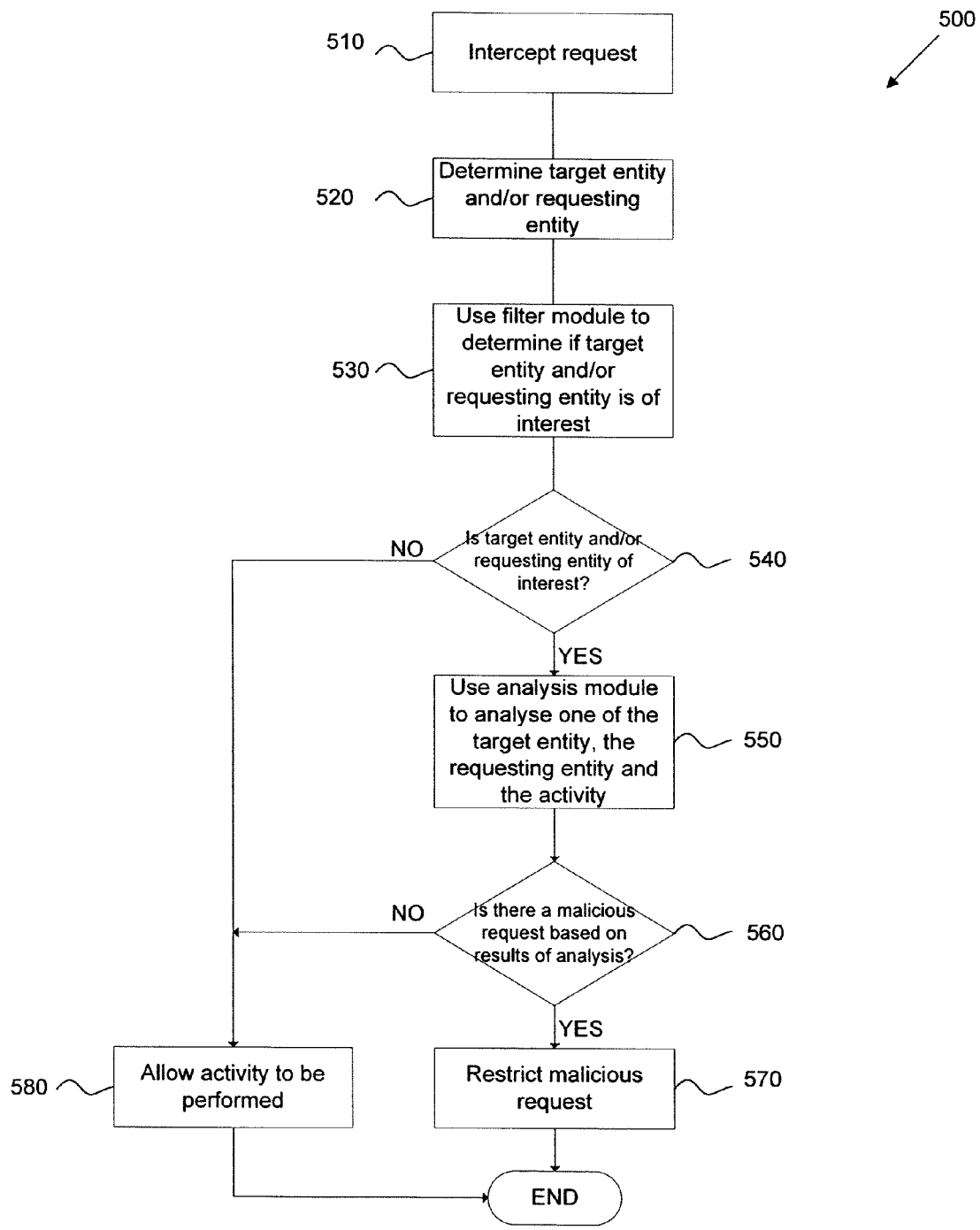
FIG. 5 illustrates a more detailed flow diagram of the method of FIG. 4.

FIG. 5 shows a more detailed flow diagram of the method of FIG. 4. In particular, at step 510, the method 500 comprises intercepting the request 200, as previously explained in relation to FIG. 3.

At step 520, the method 500 comprises determining at least one of the requesting entity 210 and the target entity 220 of the activity 230 of the request. This determination can be performed by the interception module in the form of a hook function which is used to intercept the activity 230 in the processing system 100.

At steps 530 and 540, the method 500 comprises using a filter module 1000 and one of the target entity 220 and/or the requesting entity 210 and the activity 230 to determine if the request is suspicious 1005. In the event that the request 200 is identified as being suspicious 1005, the method 500 proceeds to step 550.

At step 550, the method 500 comprises using an analysis module 480 to analyse at least one of the target entity 220, the requesting entity 210 and the activity 230 of the request. At step 560, the method 500 comprises determining, based on the results of the analysis performed at step 550, whether the request to perform the activity 230 is associated with malicious software.

In response to a positive determination, the method 500 proceeds to step 570 where the request to perform the activity 230 associated with the malicious software is restricted. This can comprise failing to call the API procedure. Alternatively, parameters passed to the API procedure are modified such that the malicious activity 485 associated with the request 200 is restricted.

In response to a negative determination, the method proceeds to step 580 where the request to perform activity is satisfied. This may comprise passing the parameters to the procedure, as outlined in FIG. 3.

Optionally the method 500 can comprise informing a user of the processing system 100 of the detection of the malicious activity 1770; prompting the user of the processing system 100 regarding the detected malicious activity 1770 and optionally receiving input from the user regarding steps to deal with the malicious activity 1770 (ie. deny the action, or allow the action). In the event that the processing system 100 in this example is a client processing system 810, the method can optionally comprise reporting the detection of malicious activity 1770 to the server processing system 840.

By using the filter module 1000, the number of false positives which subsequently require analysis are reduced. For example, if the filter module 1000 filters out system calls caused by the user interacting with the processing system 100, then such non-suspicious activities are not analysed, thereby reducing the amount of analysis to be performed. Furthermore, by filtering the activity based on the target entity 220 and/or the requesting entity 210 using the filter module 1000, a more accurate filtering process can be performed. As will be further described, the order in which the filtering is performed by the filter module 1000 can also substantially reduce the amount of processing performed when determining if an activity 230 is suspicious.

To further illustrate the advantages of using the filter module 1000, the following example is provided. An activity 230 of transferring data over a network may be monitored as an activity 230 of interest in the processing system 100 as this activity is commonly associated with malicious software. Throughout a particular period of time, the processing system 100 may record one-hundred instances when the processing system 100 transferred data over the network. A large number of these instances are likely to be non-suspicious activities 230, such as a user requesting to transfer data over the network. Performing an analysis of one-hundred activities 230 which are likely to not be suspicious can waste valuable processing and storage resources. However, by filtering the activities 230 based on the target entity 220 and/or the requesting entity 210, suspicious activities 230 which require analysis can be determined, thereby substantially reducing the number of activities 230 which require analysis to determine if malicious activity being performed, or is going to be performed, in the processing system 100. Filtering intercepted activities 230 in the processing system 100 can eliminate non-suspicious activity which is not considered to be associated with malicious activity, such as a user-initiated activity to transfer data over the network.

Figure 10:
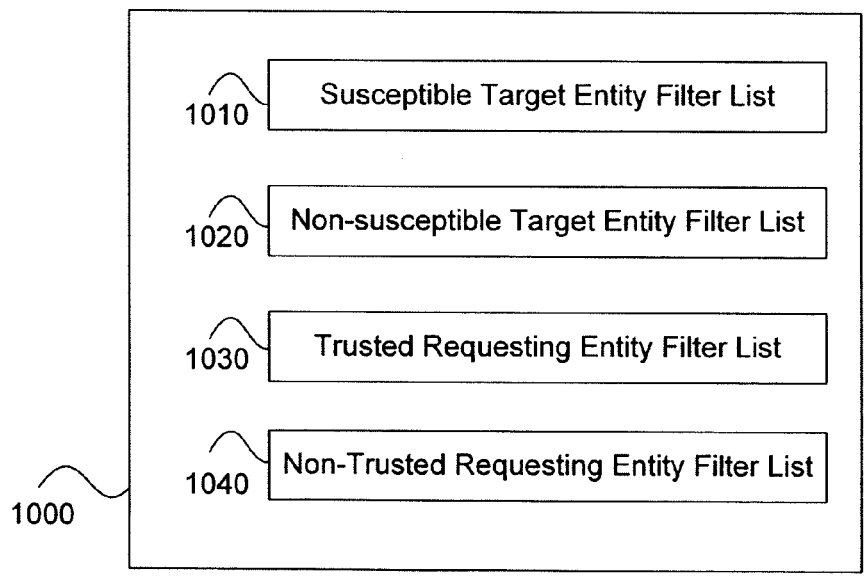
FIG. 10 illustrates a block diagram representing an example of a filter module.

Referring now to FIG. 10, there is shown a block diagram illustrating the filter module 1000. In particular, the filter module 1000 comprises a number of lists of filter rules for filtering activity intercepted in the processing system 100. The filter module 1000 can comprise at least one of a susceptible target entity filter list 1010, a non-susceptible target entity filter list 1020, a trusted requesting entity filter list 1030, and a non-trusted requesting entity filter list 1040.

The susceptible target filter list 1010 comprises one or more target entity filtering rules which determine if the target entity 220 relating to the intercepted activity 230 is of interest, thereby identifying that the activity is considered suspicious 1005. For example, a common back door entity in a processing system 100 may generally be known to be susceptible to malicious software attacks. One of the target entity filtering rules may require a comparison of the name of the target entity 220 to the name of the common back door entity, and if the susceptible target entity rule is satisfied, the target entity 220 is considered of interest, therefore identifying the request 200 as being suspicious 1005. Another susceptible target entity may be one or more registry keys of the system registry of the processing system 100. Another type of target entity filtering rule may determine whether the target entity 220 matches one of the susceptible registry keys, and if satisfied, the target entity 220 is considered of interest, thereby identifying the request 200 as being suspicious 1005.

The non-susceptible target entity filter list 1020 comprises one or more target entity filtering rules which can be used to filter out target entities 220 which are not susceptible to malicious activity 1770 and thus are not considered of interest, thereby identifying the activity as being non-suspicious 1740. By using the non-susceptible target entity filter list 1020, an activity 230 that occurs in relation to a non-susceptible target entity 220 can be dismissed as being associated with malicious activity 1770, and thus an analysis does not need to be performed in relation to the activity 230.

The trusted requesting entity filter list 1030 is similar to the non-susceptible target entity list 1020 except this list 1030 comprises one or more filtering rules to filter out trusted requesting entities which are not considered of interest (ie. there is a high probability that the requesting entity 210 is not associated with malicious request 485), thereby identifying that the activity 230 as being non-suspicious 1003. For example, the requesting entity 210 of an operating system web-site attempting to transfer an operating system update to an update application stored in a processing system 100 may be such an instance of a trusted requesting entity 210. The trusted requesting entity filter list 1030 can comprise a requesting entity filter rule to filter out such activity associated with this type of requesting entity 210 such that an analysis does not need to be performed in relation to the activity 230. By determining a trusted requesting entity 210, the request 200 is identified as being non-suspicious 1003.

The non-trusted requesting entity filter list 1040 is similar to the susceptible target entity filter list 1010 except this list 1040 comprises filter rules to determine requesting entities 210 which are of interest (ie. there is a high probability that the requesting entity 210 is associated with a malicious request 485). For example, a requesting entity 210 attempting to open a specific port in the processing system 100 may be an example of a non-trusted requesting entity 210. The non-trusted requesting entity filter list 1040 can comprise a requesting entity filter rule which determines whether the requesting entity 210 is located outside a particular network domain, and if the filter rule is satisfied, the requesting entity 210 is identified as being of interest, which thereby identifies the activity 230 as being suspicious 1005.

Each filter rule in each list can have an associated filter rule identity. When a filter rule is satisfied, an identity of the satisfied filter rule can be recorded. Over time, particular filter rules may be satisfied on a higher frequency than other filter rules. The frequency of satisfaction for each rule can then be used to determine a filtering rating indicative of the frequency of satisfaction for the respective filter rule. As will be described in more detail below, the filtering rating can be used to determine an order which filter rules are used when filtering intercepted requests such that, on average, the number of filter rules used, prior to a filter rule being satisfied, is reduced. This process of determining an order which the filter rules can be performed by a single processing system 100 or alternatively, in a networked system (comprising a plurality of client processing systems 810 and at least one server processing system 840), can be performed by the at least one server processing system 840, as will be explained in more detail below.

In some instances, a request 200 may have been identified as being non-suspicious using one of the lists of the filter module 1000, whereas a different list of the filter module 1000 may have identified the same request 200 as being suspicious. In this instance, the worst case scenario can be considered, which can be to assume that the request 200 is suspicious. One approach to is to use the susceptible target filter list 1010 and the non-trusted requesting entity filter list 1040 first prior to the non-susceptible target entity filter list 1020 and the trusted requesting entity filter list 1030 such that the worst case scenario is given priority.

In other instances, a request 200 may not be identified as being suspicious nor non-suspicious. In this instance, a default identification can be assigned to the request 200. Therefore, the default may be to identify the request 200 as being suspicious 1005 such that an analysis can be performed on one of the associated entities 210, 220. However, a more lenient approach may be to set the default identification as being non-suspicious 1003. In one form, the default identification can be defined by the user of a processing system 100.

Figure 6A:
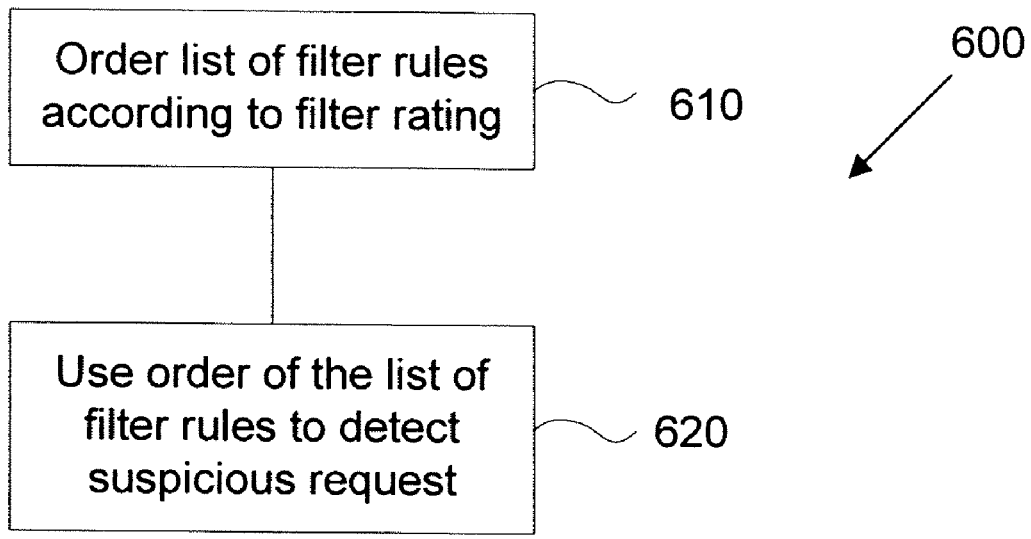
FIG. 6A illustrates a flow diagram illustrating an example method of determining an order of a list of filter rules to detect malicious activity.

Referring to FIG. 6A, there is shown a flow diagram representing an example method 600 to facilitate the detection of malicious activity in a processing system 100.

In particular, at step 610, the method 600 comprises, in the processing system 100, determining an order of a list of filter rules according to a filter rating associated with each filter rule in the list. At step 620, the method 600 comprises using the order of the filter rules to determine a suspicious request in the processing system 100.

Figure 6B:
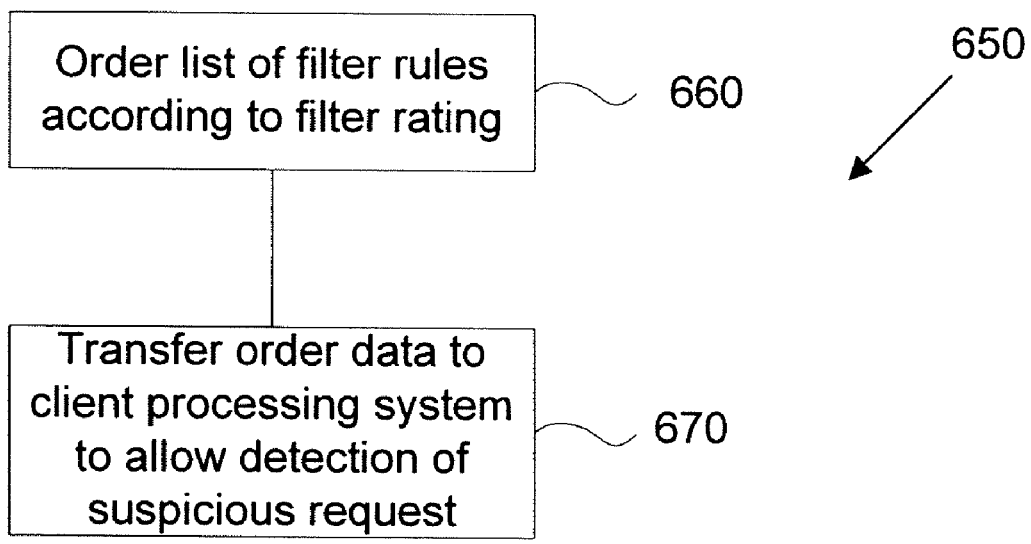
FIG. 6B illustrates a flow diagram illustrating an example method of determining an order of a list of filter rules in a server processing system to detect malicious activity.

Referring now to FIG. 6B there is shown another flow diagram representing an example method 650 performed by a server processing system 840 to facilitate the detection of a malicious request 485 in a client processing system 810.

In particular, at step 660, the method 650 comprises, in a server processing system 840, determining an order of a list of filter rules according to a filter rating associated with each filter rule in the list. At step 670, the method 650 comprises, transferring the determined order of the list of filter rules from the server processing system 840 to the client processing system 810 to allow the client processing system 810 to use the order of the filter rules to determine a suspicious request in the client processing system 810.

As will be appreciated below, using a distributed system (a plurality of processing systems 810 and at least one server processing system 840—FIG. 6B) advantageously allows the generation of the filter ratings and order of the filter rules using a larger number of samples from the plurality of client processing systems 810. However, in single processing system 100 forms (FIG. 6A), the filter ratings and the order of the filter rules is advantageously customised for that particular processing system 100.

Figure 7:
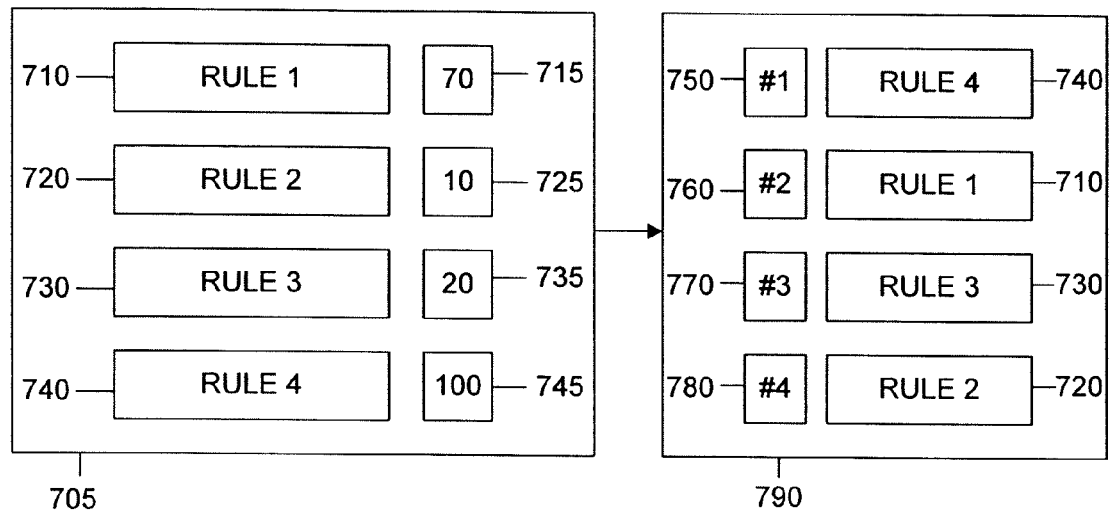
FIG. 7 illustrates a block diagram illustrating an example of determining an order of a list of filter rules.

Referring now to FIG. 7 there is shown a block diagram illustrating the process of determining an order of a list of filter rules.

In particular, the block diagram comprises a list 705 of filter rules 710, 720, 730, 740. Each filter rule has a respective associated filter rating 715, 725, 735, 745. Each filter rating is at least indicative of the frequency that the respective filter rule has been previously satisfied that a target entity 220 and/or a requesting entity 210 is of interest. In this example, "Rule 1" 710 has an associated filter rating 715 of "70" and "Rule 2" 720 has an associated filter rating 725 of "10". This indicates that "Rule 1" has been satisfied more frequently than "Rule 2" in relation to a target entity 220 and/or a requesting entity 210 being identified as being of interest (ie. the activity 230 has been identified as being suspicious 1750).

As shown in ordered list 790, the filter rules are ordered in descending order according to the respective filter ratings for each filter rule in the list 705. Thus, "Rule 4" 740 has the highest filter rating and therefore this filter rule is positioned at the start 750 of the list. "Rule 1" has the next highest filter rating and is therefore positioned second 760, followed by "Rule 3" and then "Rule 2".

By determining an order of the filter rules according to the filter rating, rules which have been satisfied more frequently are used first when determining if the requesting entity and/or target entity is considered of interest prior to less frequently satisfied filter rules in the list 705. This order of use can, on average, reduce the number of filter rules that need to be used, prior to one of the filter rules being satisfied. Order data 790 indicative of the order of the list 790 can be transferred to one or more client processing systems 810 such that the order indicated by the order data 790 can be used when applying the filter rules to determine suspicious requests 1005.

It will be appreciated that the order data 790 may be transferred to the plurality of client processing systems 810 in response to feedback filter data 820 being received from one of the client processing systems 810. Additionally or alternatively, one of the client processing systems 810 may transfer a request for an updated order of the filter rules, and in response, the server processing system 840 transfers the order data 790 to the requesting client processing system 810. Updated filter rules may also be transferred to one or more client processing systems 810. In another additional or alternative form, the server processing system 840 may be scheduled to periodically transfer the order data to the plurality of the client processing systems 810. This for example, could be accomplished through e-mail as well as other known data transferal techniques.

Figure 8:
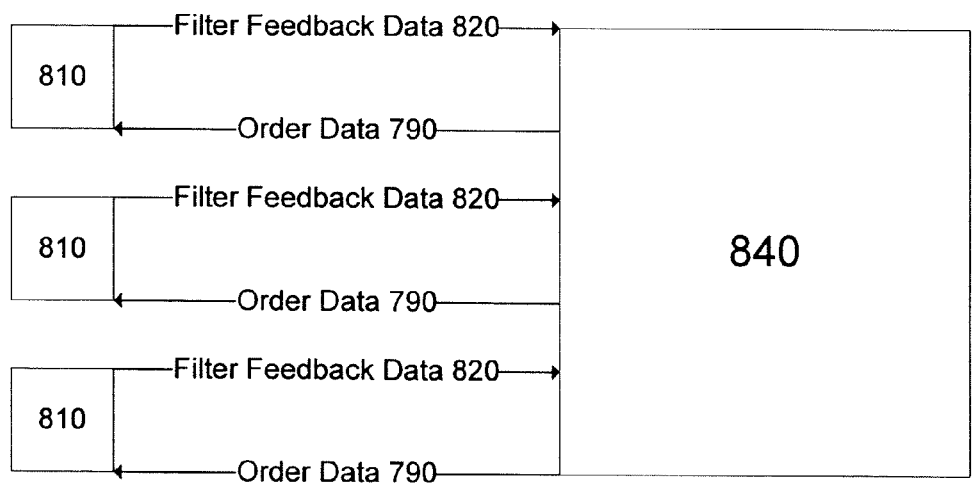
FIG. 8 illustrates a block diagram illustrating an example of a system comprising a client processing system and a server transferring and receiving order data and feedback detection data.

FIG. 8 shows a block diagram illustrating an example of the system 1 comprising a plurality of client processing systems 810 and a server processing system 840.

In particular, each client processing system 810 transfers, to the server processing system 840, filter feedback data 820 indicative of frequencies that one or more filter rules has been satisfied. The server processing system 840 updates a satisfaction frequency stored for each relevant filter rule using the filter feedback data 820. The server processing system 840 then updates relevant filter ratings for each rule based on the filter feedback data 820, and then orders the filter rules in each list according to the updated filter ratings. Order data 790 indicative of the order of the filter rules in each list is then transferred to the client processing systems 810 such that each client processing system 810 can use filter rules in the order represented by the order data when determining if a target entity 220 and/or requesting entity 210 is of interest, thereby, on average, reducing the number of rules which are required to be used.

Figure 9:
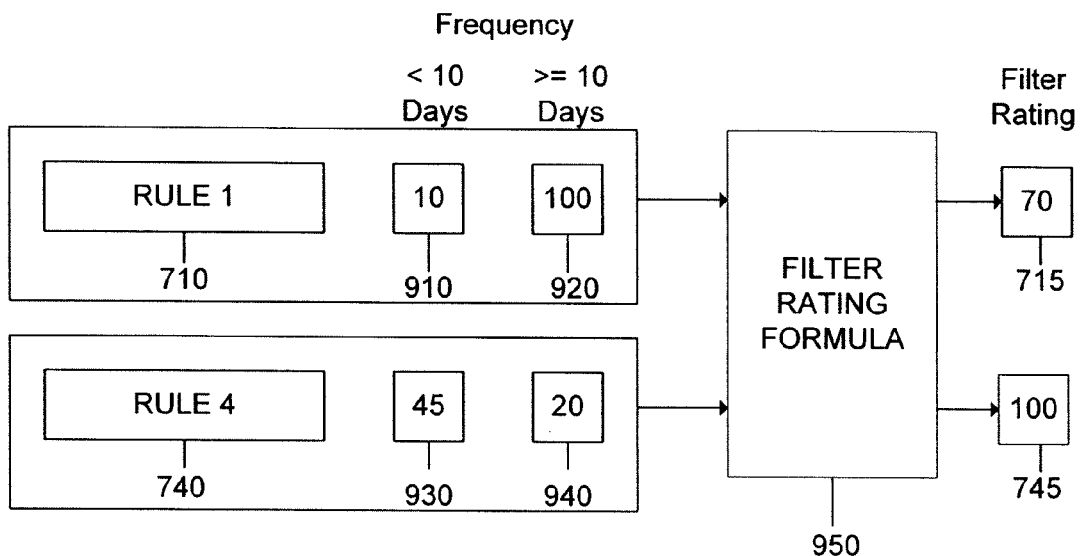
FIG. 9 illustrates a block diagram illustrating the determination of a filter rating.

Referring to FIG. 9, there is shown a block diagram illustrating the determination of the filter rating.

As previously indicated, each filter rule stored in the server processing system 840 comprises an associated frequency indicative of the number of times the filter rule has been satisfied in the plurality of client processing systems 810. The frequency can be split into a number of portions. In this example, the frequencies are split into two portions: a first portion 910, 930 being the frequency that the filter rule had been satisfied within the past ten days; and a second portion 920, 940 being the frequency that the filter rule had been satisfied outside the past ten days. As seen from FIG. 9, "Rule 1" 710 has been satisfied ten times within the past ten days and has also been satisfied one-hundred times outside the past ten days. "Rule 4" 740 has been satisfied forty-five times within the past ten days and has also been satisfied twenty times outside the past ten days.

This distribution of frequencies between the frequency portions 910, 920, 930, 940 can indicate a trend of malicious requests 485 in relation to the plurality of client processing systems 810. For example, in regard to "Rule 1" 710, which may be a susceptible target entity filter rule, there may have been a software patch that has been recently distributed amongst client processing systems 810 that has resulted in "Rule 1" being satisfied less often compared to past frequencies that occurred outside the ten day period. In regard to "Rule 4" 740, which may also be a susceptible target entity filter rule, there may have been an outbreak of malicious software which is targeting particular susceptible entities and accordingly "Rule 4" has recently been satisfied more often compared to past frequencies that occurred outside this ten day period, as indicated by the rise of the frequency within the past ten days.

In order to take into account trends in malicious activity, such as outbreaks of specific malicious requests and distributions of software patches, a filter rating formula 950 is used to weight the distribution of frequencies for each filter rule. In this example the filter rating formula is shown below:

$$FilterRating = 2 \times recentFreq + 0.5 \times olderFreq$$

Where:
recentFreq=frequency of instances when the rule was satisfied within last 10 days
olderFreq=frequency of instances when the rule was satisfied outside last 10 days It will be appreciated that differing weights can be used. Furthermore, it will be appreciated that a larger breakdown of frequency distribution can be used.

As can be seen from the filter rating formula 950, the frequency of instances when the filter rule was satisfied within the past ten days is weighted more heavily in order to take into account trends of malicious requests. Thus, the filter rating for "Rule 1" and "Rule 4" are calculated to be:

$$FilterRatingRule1 = 2 \times 10 + 0.5 \times 100 = 20 + 50 = 70$$

$$FilterRatingRule4 = 2 \times 45 + 0.5 \times 20 = 90 + 10 = 100$$

As can be seen from the respective filter ratings 715, 745 for "Rule 1" 710 and "Rule 4" 740, even though "Rule 1" 710 has been satisfied more often in the past as indicated by frequency 920, it appears that "Rule 4" 740 has recently been satisfied more often (indicated by frequency 930) due to an outbreak of malicious software targeting susceptible entities which "Rule 4" 740 determines to be of interest. Thus, "Rule 4" 740 receives a higher filter rating 745 compared to the filter rating 715 of "Rule 1" 710 due to the recent trend in malicious requests. When this list of filter rules is ordered, "Rule 4" 740 is ranked higher in the list compared to "Rule 1" 710 and therefore "Rule 4" 740 is used prior to "Rule 1" 710 when determining suspicious activity 1005. As "Rule 4" 740 has recently been satisfied more often due to the trend in malicious activity, it is more likely that an activity 230 would be identified as being suspicious using "Rule 4" 740 rather than "Rule 1" 710. Therefore, "Rule 4" 740 can be used first when filtering an intercepted request 475 so as to reduce the number of instances that "Rule 1" 710 is used by the filter module 1000. On average, this ordering of the filter rules can reduce the number of applications of rules by the filter module 1000, thereby resulting in an efficient filtering process.

Figure 11:
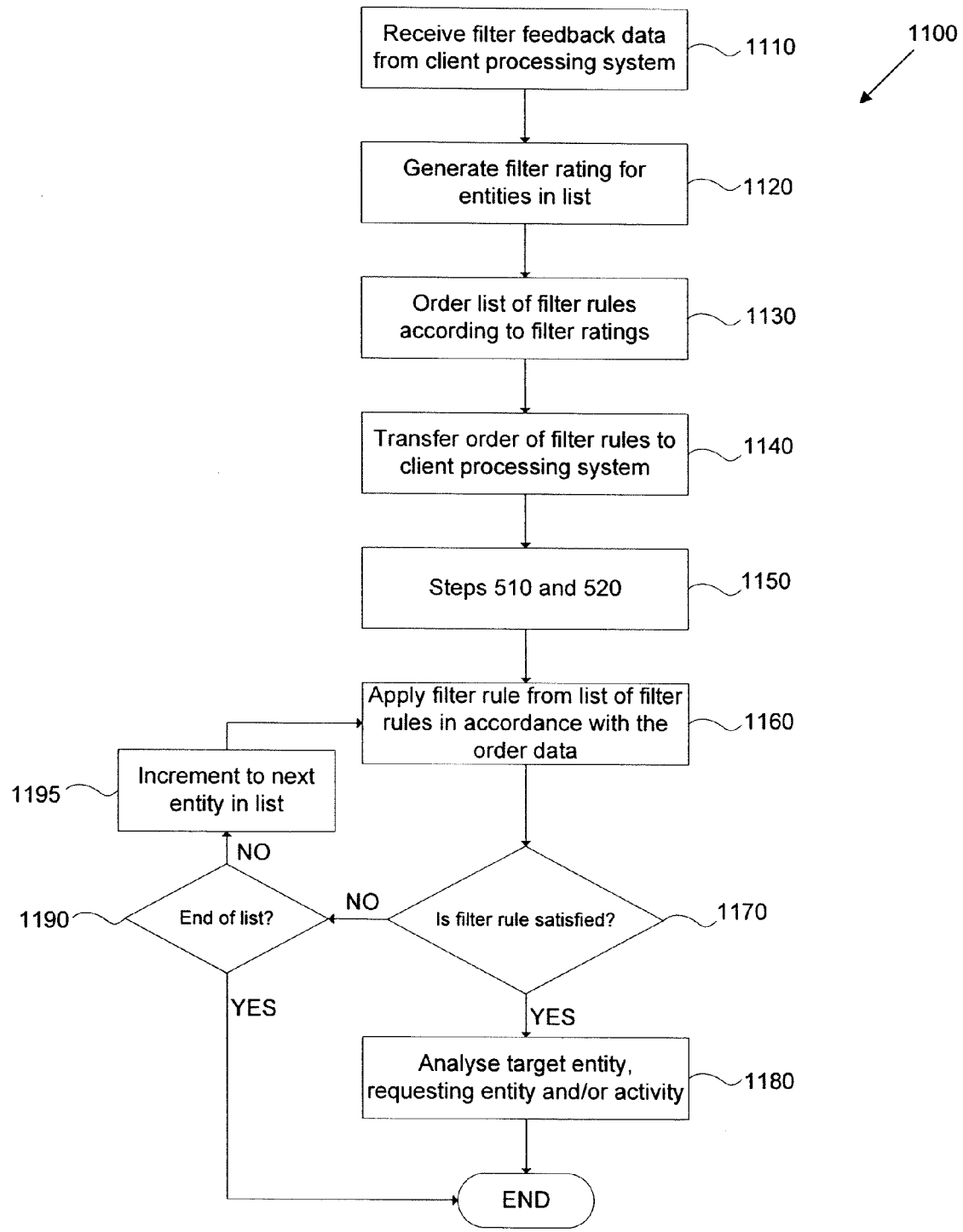
FIG. 11 illustrates a flow diagram representing a more detailed example of the method illustrated in FIG. 6B.

Referring now to FIG. 11, there is shown another more detailed example of the method of FIG. 6B. For simplicity purposes, the filter module 1000 in this example comprises only a single filter list, that being a susceptible target entity filter list 1010. However, it will be appreciated that the filter module 1000 can use more than one filter list, as previously indicated.

At step 1110, the method 1100 comprises the server processing system 840 receiving feedback filter data 820 indicative of frequencies that the susceptible target entity filter rules have been satisfied. At step 1120, the method 1100 comprises the server processing system 840 generating filter ratings for the relevant susceptible target entity filter rules in the list. At step 1130, the method 1100 comprises determining an order of the list of susceptible target entity filter rules according to the associated filter ratings. At step 1140, the method 1100 comprises the server processing system 840 transferring order data 790 indicative of the order of the list of susceptible target entity filter rules to the client processing system 810.

At step 1150, the method 1100 comprises performing steps 510 and 520 of method 500. At step 1160, the method 1100 comprises retrieving a susceptible target entity filter rule, according to the order data 790, from the susceptible target entity filter list and then applying the susceptible entity filter rule in relation to the target entity 220 of the intercepted activity 475. The application of the susceptible target entity filter rule may comprise comparing the target entity 210 name to a known susceptible target entity, however, more complex comparisons may be performed by each susceptible target entity filter rule such as comparing cryptographic hash values of the susceptible target entity to that of the target entity 220.

At step 1170, in the event that the susceptible target entity filter rule is satisfied such that the target entity 220 for the intercepted activity 475 is considered of interest, which thereby identifies the activity 230 as being suspicious 1005, the method 1100 proceeds to step 1180 where the analysis module 480 is used to analyse at least one of the target entity 220, the requesting entity 210 and the activity 230.

In the event that the susceptible target entity filter rule is not satisfied, the method 1100 proceeds to step 1190 where the method 1100 determines whether the end of the list of susceptible target entity filter rules has been reached. If the end of the list has not been reached, the method 1100 proceeds to step 1195 which comprises incrementing to the next susceptible entity target filter rule in the list. For example, in regard to the example in FIG. 7, "Rule 4" 740 would have been used first, and then in the event that "Rule 4" 740 was not satisfied, "Rule 1" 710 would then be applied next as this filter rule has the next highest filter rating according to the order data 790.

Steps 1160 and 1170 are iteratively performed until either the end of the list is reached, or a filter rule is satisfied. Due to the filter rules in the list being ordered according to the filter rating, on average, the number of rules which are applied, prior to a filter rule being satisfied, is reduced.

Figure 12:
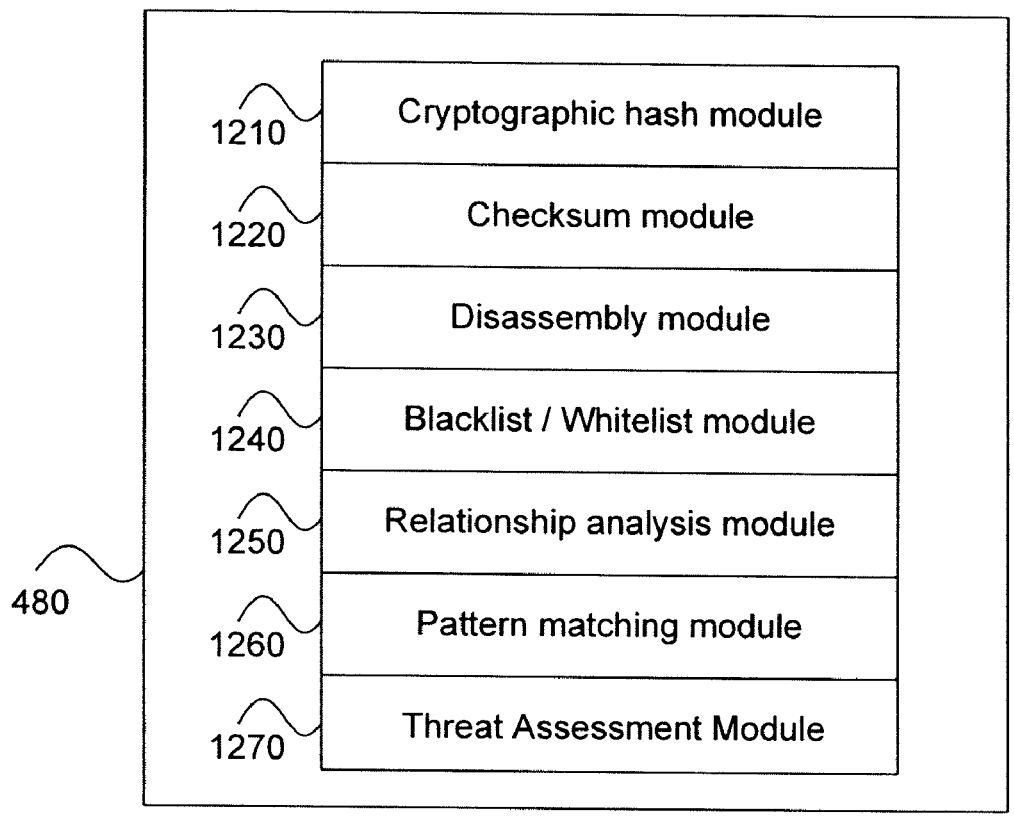
FIG. 12 illustrates a block diagram representing an analysis module.

As shown in FIG. 12, the analysis module 480 can comprise a number of further sub-modules to determine a malicious request 485.

In particular, the analysis module 480 can comprise the sub-modules of a cryptographic hash module 1210, a checksum module 1220, a disassembly module 1230, a black-list/white-list module 1240, a relationship analysis module 1250, and a pattern matching module 1260, and a threat assessment module 1270. The analysis module 480 can be used to determine if the request 200 by the requesting entity 210 to perform the activity 230 in relation to the target entity 220 is associated with malicious software.

The analysis module 480 can be configured to use one or more of these sub-modules exclusively or in combination to detect malicious activity 1770 in the processing system 100. The analysis module 480 can be used to analyse at least one of the target entity 220, the requesting entity 210, and the activity 230 to determine if request 200 is malicious.

The cryptographic hash module 1210 of the analysis module 480 is configured to generate a cryptographic hash value of an entity. As the cryptographic hash value can be used an identity, the cryptographic hash value can be used in comparisons with the blacklist/whitelist module 1240 to determine whether the entity is malicious.

The checksum module 1220 of the analysis module 480 is configured to determine a checksum of an entity of the processing system 100. The checksum can be compared to a database (blacklist/whitelist module 1240) to determine whether the entity is malicious.

The pattern matching module 1260 of the analysis module 480 is configured to search an entity for particular patterns of strings or instructions which are indicative of malicious activity. The pattern matching module 1260 may operate in combination with the disassembly module 1230 of the analysis module 480.

The disassembly module 1230 is configured to disassemble binary code of an entity such that the disassembly module 1230 determines processing system instructions for the entity. The processing system instructions of the entity can then be used by the pattern matching module 1260 to determine whether entity is malicious. Although strings of instructions can be compared by the pattern matching module 1260, the pattern matching module 1260 may be configured to perform functional comparisons of groups of instructions to determine whether the functionality of the entity is indicative of malicious software.

The blacklist/whitelist module 1240 of the analysis module 480 comprises a list of malicious and/or non-malicious entities. The blacklist/whitelist module 1240 may be provided in the form of a table or database which comprises data indicative of malicious and non-malicious entities. The table may comprise checksums and cryptographic hash values for malicious and non-malicious entities. The data stored in the blacklist/whitelist module 1240 can be used to determine whether an entity in the processing system 100 is malicious or non-malicious.

Figure 13:
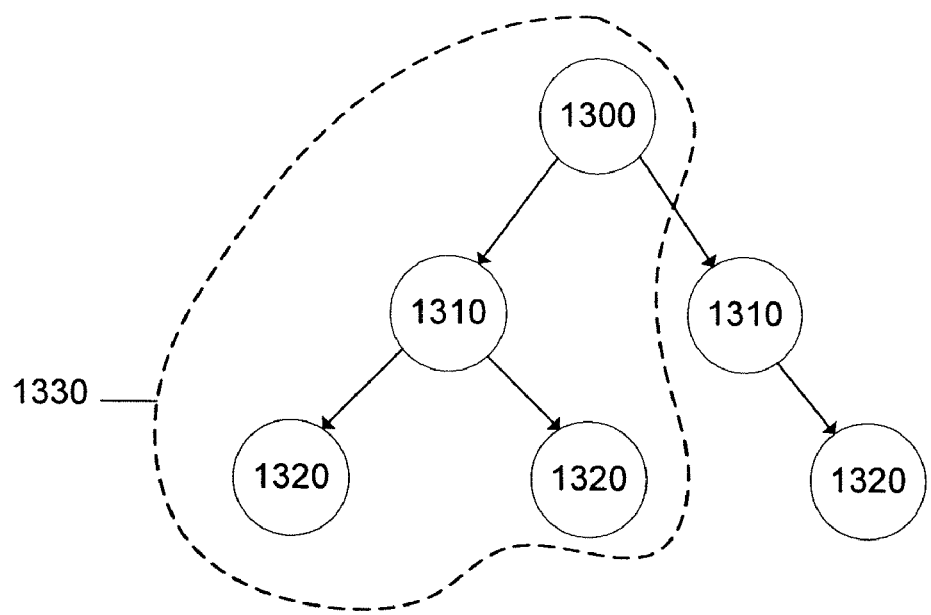
FIG. 13 illustrates a functional block diagram of the operation of a relationship analysis module.

The relationship analysis module 1250 can be used to detect related entities based on a starting entity 1300. As shown by example in FIG. 13, once a target entity 220 or requesting entity 210 has been determined to be of interest using the filter module, the target entity or requesting entity can be treated as the starting entity 1300, and then using the relationship analysis module 1250, a web of entities 1330 related to the starting entity 1300 can be determined. A detailed explanation of detecting related one or more related entities is described in the Applicant's co-pending U.S. patent application Ser. No. 11/707,425 and co-pending Australian Patent application AU2007200605 entitled "Determination of related entities", the content of which is herein incorporated by cross-reference.

In some instances, malicious software can comprise a bundle of malicious entities. By only considering a single entity by itself, it may not be accurately possible to determine if a target entity 220 or requesting entity 210 is malicious. However, by determining related entities to the target entity 220 or requesting entity 210, a more accurate assessment can be made in relation to whether or not the suspicious activity 1005 is malicious 485. Furthermore, removing a single malicious entity may not necessarily disable the malicious software from performing some malicious activity. Some particular forms of malicious software can perform repairs in relation to a single malicious entity being removed or disabled. Therefore, detecting a group of related entities 2000 can be beneficial for disabling malicious software.

Figure 14:
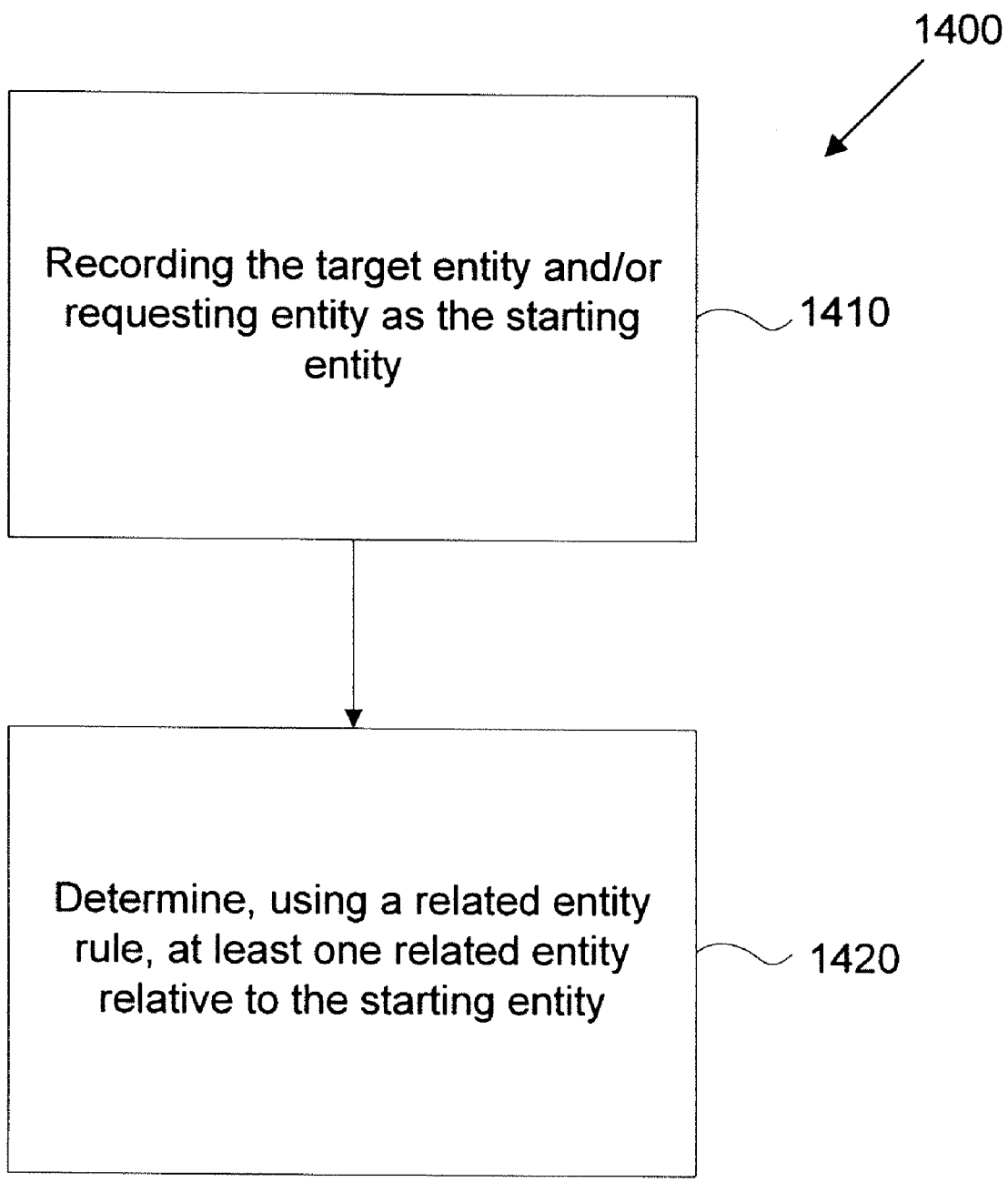
FIG. 14 illustrates a flow diagram representing an example of a method performed by the relationship analysis module.

Referring now to FIG. 14, there is illustrated a flow diagram illustrating an example method 1400 of determining a group of related entities 2000 in a processing system 810. The method 1400 represents the operation of the relationship analysis module 1250.

In particular, at step 1410 the method 1400 comprises recording the target entity 220 and/or requesting entity 220, which was determined to be of interest, as the starting entity 1300. At step 1420, the method 1400 comprises determining, using a related entity rule, at least one related entity 1310 relative to the starting entity 1300. The related entities can then each be analysed to determine if the request 200 to perform an activity 230 is associated with malicious software.

Figure 15A:
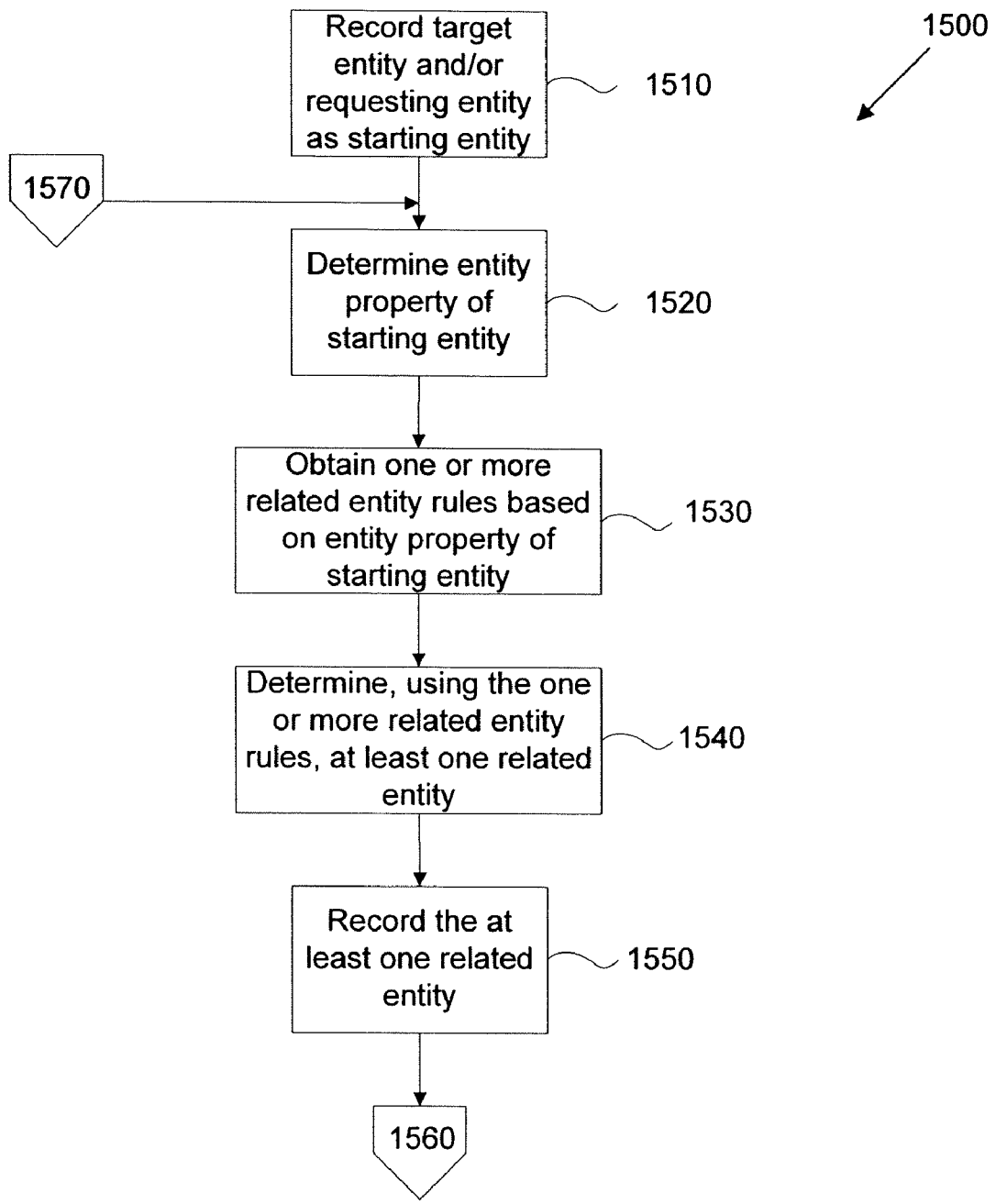
FIGS. 15A and 15B illustrate a more detailed flow diagram of the example method of FIG. 14.
Figure 15B:
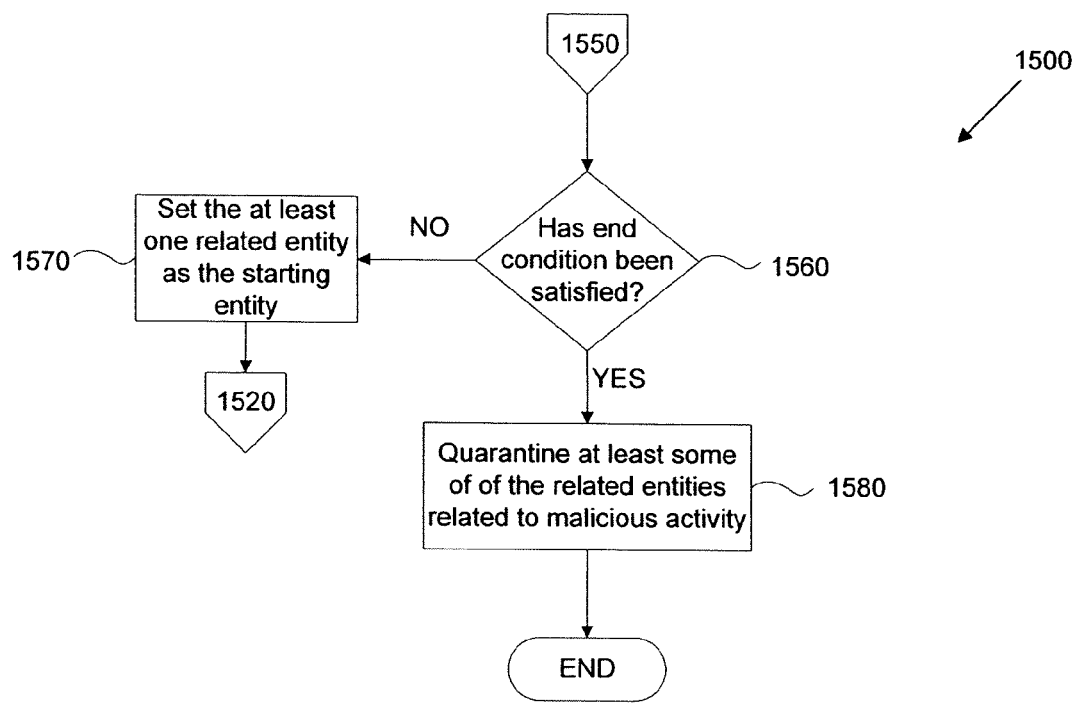

Referring now to FIGS. 15A and 15B, there is shown a method 1500 of determining related entities relative to the starting entity 1300. Method 1500 determines a group of suspicious related entities relative to the starting entity 1300. However, it will be appreciated that method 1500 can be adapted to determine any form of related entities, such as trusted related entities relative to the starting entity 1300.

At step 1510, the method 1500 comprises recording the starting entity 1300. This generally comprises the processing system 100 recording the starting entity 1300 in the processing system memory, such as a data store. The starting entity 1300 may be stored in the form of a table or list.

At step 1520, the method 1500 comprises determining an entity property associated with the starting entity 1300. The entity property may be an entity type of the entity, such as whether the starting entity 1300 is an executable entity, a run key entity or a dynamic linked library entity. The entity property may also be a time that the starting entity 1300 was created or modified. The entity property may comprise the directory which the starting entity 1300 is contained within. The entity property may also be a vendor name associated with the starting entity 1300. The entity property may also be a particular network address from which the starting entity 1300 was downloaded.

It will be appreciated that more than one entity property may be determined for the starting entity 1300. However, for the purposes of simplicity, throughout this example it will be assumed that one entity property has been determined for the starting entity 1300.

At step 1530, the method 1500 comprises obtaining, based on the entity property of the starting entity 1300, one or more related entity rules. In this particular example, the one or more related entity rules take the form of one or more rules for determining one or more suspicious entities related to the starting entity 1300. Step 1530 may comprise selecting, based on the entity property, the one or more related entity rules from a larger set of related entity rules. Each related entity rule is associated with a particular entity property, and as such, a selection of a related entity rules can be performed based on the entity property of the starting entity 1300. An example list of entity properties and corresponding related entity rules is shown below in List 1.

(i) if the starting entity comprises a vendor name, the at least one suspicious related entity is one or more entities comprising the same vendor name;

(ii) if the starting entity comprises a product name, the at least one suspicious related entity is one or more entities comprising the same product name;

(iii) if the starting entity comprises a version name, the at least one suspicious related entity is one or more entities comprising the same version name;

(iv) if the starting entity was created at a particular time in the one or more processing systems, the at least one suspicious related entity is one or more entities which were created at a similar time to that of the starting entity;

(v) if the starting entity accesses a particular network address or network address range or network address names, the at least one suspicious related entity is one or more entities which also access the same particular network address or network address range or network address names.

(vi) if the starting entity accesses a particular network address or network address range, the at least one suspicious related entity is the particular network address or network address range or network address names.

(vii) if the starting entity causes another process to execute, the at least one suspicious related entity is one or more entities which was executed by it.

(viii) if the starting entity was executed by a process, the at least one suspicious related entity is one or more entities which executed the starting entity.

(ix) If the starting entity creates or modifies an entity, the at least one suspicious related entity is one or more entities which it creates or modifies.

(x) If the starting entity is found in a directory not in a list of whitelist directories, the at least one suspicious related entity is one or more entities which also exist in the same directory.

(xi) If the starting entity is downloaded from the internet/tcpip, the at least one suspicious related entity is one or more entities which were downloaded at the same time or by the same process or from the same particular network address or network address range or network address names.

List 1: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 1

Further example of Entity Properties and corresponding related entity rules

| Entity Property | Related Entity Rule |
|---|---|
| trigger entity | The one or more suspicious related entities are triggerable entities which are triggerable by the run-key entity |
| executable entity | The one or more suspicious related entities are one or more files in an INF file associated with the starting entity |
| executable entity | The one or more suspicious related entities are one or more trigger entities which trigger the starting entity |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids assocaiated with the starting entity |
| executable entity | The one or more suspicious related entities are one or more network addresses or network address ranges or network address names associated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |

TABLE 1-continued

Further example of Entity Properties and corresponding related entity rules

| Entity Property | Related Entity Rule |
| --- | --- |
| classid/guid entity | The one or more suspicious related entities are one or more executable entities related to the classid/guid |
| module entity | The one or more suspicious related entities are one or more executable entities that are loaded by the module entity |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one ore more executable entities executed by the starting entity |
| Cookie entity | The one or more suspicious related entities are one or more network addresses or network address ranges or network address names associated with the starting entity |
| windows instance entity | The one or more suspicious related entities are one ore more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one ore more entities within the archive entity |
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which a similar creation/modification time |

It will be appreciated that a starting entity having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 1 that the general entity properties and related entity rules can be extended to specific entity types, such as the entity types shown in Table 1, for example INF entities, Cookies entity, windows instance entity and the like shown above. The more specific rules in Table 1 allow for a more specific selection of rules based on the more specific entity property, which can therefore result in accurately determining the relevant suspicious related entity rules.

It will also be appreciated from Table 1 that more than one related entity rule can be obtained based on the one or more entity properties of the starting entity. As shown above in Table 1, if the entity property indicates that the starting entity is an executable entity, then nine separate types of related entity rules can be applicable for determining the related entities to the starting entity which are considered suspicious.

Additionally or alternatively, the processing system 100 may transfer, to a server processing system 720, one or more entity properties of the starting entity 1300, and receive, from the server processing system 720, the one or more related entity rules. In this step, the server processing system 720 may select the one or more related entity rules using the entity property from a server set of related entity rules, and then transfer the one or more related entity rules to the processing system 100.

At step 1540, the method 1500 comprises determining, using the one or more related entity rules, the at least one related entity 1310, 1320. In this particular example the related entity rules determine one or more related suspicious entities. For simplicity purposes, the following example is presented using one related entity rule, however, it will be appreciated that more than one related entity rule can be used. Using an example entity of "Spywarz.exe" which has a vendor name of "Spywarz Software Enterprises", the following related entity rule can be obtained:

"The one or more related entities have a vendor name equalling 'Spywarz Software Enterprises'".

This related entity rule is then used to determine any entities in the processing system 100 which satisfy this rule. Once a scan has been performed using the related entity rule, it is determined that "Spywarz.dll" also shares a vendor name of 'Spywarz Software Enterprises'. As the related entity rule has been satisfied, 'Spywarz.dll' is considered a related entity to the starting entity 'Spywarz.exe'. As such, a group of suspicious related entities has been determined which comprises 'Spywarz.exe' and 'Spywarz.dll'.

Optionally, weighted values may be associated with the related entity rules.

Steps 1510 to 1540 represent a single iteration to determine a group of suspicious related entities 1310, 1320. However, if a more detailed group of related entities is required, it is possible to perform multiple iterations of steps 1510 to 1540, as will now be discussed.

At step 1550, the at least one related entity 1310, 1320 is recorded. This may involve adding the at least one related entity 1310, 1320 to a list or a table which comprises the starting entity 1300 recorded at step 1510. Furthermore, the list or table may comprise data indicative of the relationship between the at least one related entity 1310, 1320 and entities which have been previously recorded.

At step 1560, the method 1500 comprises determining if an end condition has been met. For example, the end condition may be satisfied when no other related entities are determined; when no other related entities are determined in a period of time; when the current starting entity has an entity type which is indicative of the end condition; and/or when a selected number of repetitions have been performed. If the end condition has not been met, the method 1500 continues to step 1570.

At step 1570, the method 1500 comprises setting the at least one related entity 1310, 1320 as the starting entity 1300. This may be performed in memory by reassigning the value of the starting entity 1300. By setting the at least one related entity 1310, 1320 as the starting entity 1300, steps 1520 to 1550 can be repeated until an end condition is met, as will be discussed in more detail below. As will be appreciated in this example, there are now two starting entities due to two related entities being determined in the first iteration.

Once the end condition is satisfied, the determination of the group of suspicious related entities 2000 has been completed. Optionally, the recordings can be presented to a user of the processing system 100. The group of related entities 2000 may be presented in a tabular form or may be presented in a graphical representation. Additionally, the group of related entities 2000 may presented indicating direct or indirect links between entities in the group. For example, 'Spywarz.exe' and 'Spywarz.dll' for the above example would have a direct link. However, if a subsequent related entity to 'Spywarz.dll' was determined to be a system variable 'SPYWARZ_VARIABLE', then there would be an indirect link between 'Spywarz.exe' and 'SPYWARZ_VARIABLE'.

Figure 16A:
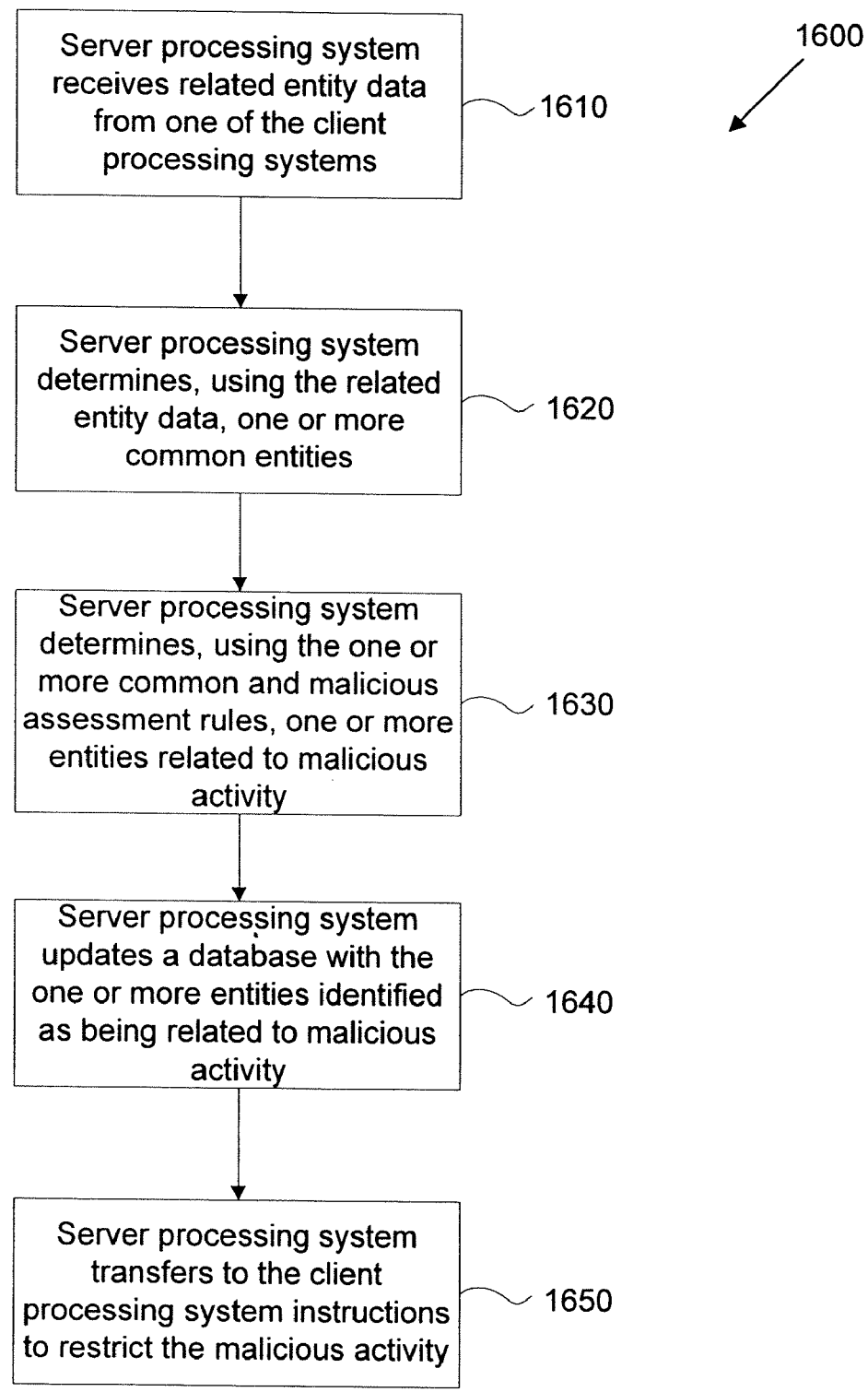
FIG. 16A illustrates a flow diagram of an example method of using a server processing system to detect malicious activity.

Referring now to FIG. 16A there is shown a flow diagram illustrating an example method 1600 of identifying malicious activity at the server processing system 720.

In particular, at step 1610 the method 1600 comprises receiving, in the server processing system 840, the suspicious related entity data 1690 from the one or more client processing systems 810 described above. The suspicious related entity data 1690 may comprise measurements and or properties associated with each suspicious related entity in the group 2000.

Additionally or alternatively, the suspicious related entity data 1690 may be the actual entities which are transferred from the one or more client processing systems 810 to the server processing system 840. The server processing system 840 may also receive a suspicion identifier indicative of behaviour associated with the suspicious entities 2000. For example, the suspicion identifier may be indicative of the suspicious entities 2000 being associated with a pop-up window being displayed at the client processing system 810 at regular intervals. The suspicious related entity data 1690 may also comprise data indicating the starting entity 1300 in the group 2000. The suspicious related entity data 1690 may also be indicative of one or more relationships (direct or indirect) between entities of the group, similar to that of a linked list.

At step 1620, the server processing system 840 determines, using the suspicious related entity data 1690, one or more common suspicious entities. This step comprises determining if the suspicious entity data 1690 received from the client processing system 810 comprises one or more suspicious entities in common with other records of suspicious entity data 1690 received from other client processing systems 810. If suspicion identifiers were received from the client processing systems 810 in relation to the suspicious entity data 1690, the server 840 may use the suspicion identifier to narrow the selection of common suspicious entities. By determining the common suspicious entities, the group of suspicious entities which may be malicious 485 can be reduced and further significantly increases efficiency in determining the one or entities associated with the malicious activity. Furthermore, this step provides a filter system of determining which suspicious entities are in common with different records of suspicious entities.

At step 1630, the method 1600 comprises the server processing system 840 analysing the one or more common suspicious entities to determine one or more malicious entities 485. The server processing system 840 can comprise a malicious assessment module configured to determine whether one or more of the common related entities are malicious 485.

The malicious analysis module can comprise a set of malicious assessment rules to determine a level of maliciousness of the common suspicious entities. The level of maliciousness can then be compared to a maliciousness limit, and in the event of a successful comparison, at least some of the common suspicious related entities are identified as malicious 485.

In one form, if a common suspicious entity satisfies a particular malicious assessment rule, the common suspicious entity is associated with a value or weight indicating how malicious the entity is considered. If the same common suspicious entity satisfies a number of particular malicious assessment rules, the values or weights associated with the entity are totaled. The total value or weight can be compared to a maximum limit to determine whether the common suspicious related entity is a malicious entity.

The malicious assessment rules are generally considered to be a stricter set of rules comparatively to the related entity rules used at the client processing system 810. The related entity rules can be used as a first filter. The determination of common suspicious related entities can then be used as a second filter. The malicious assessment rules can then be used as a third filter to determine a malicious entity at one of the client processing systems.

As the malicious assessment rules are generally more complex and considered more complete comparative to the related entity rules, a number of the suspicious entities may not satisfy the malicious assessment rules and are therefore not identified as malicious. For example, a legitimate printer driver may have been identified as a common suspicious entity due to a particular malicious entity using the printer driver to perform malicious activities using the one of the client processing systems 810. However, after the malicious assessment rules are applied, the printer driver is determined to not be malicious. The remaining common suspicious entities which satisfy the malicious assessment rules are identified as being malicious to the one or more client processing systems 810.

At step 1640, the method 1600 comprises the server processing system 840 recording in a database the one or more malicious entities 485 identified in step 1630. This process is particularly useful for early detection of new or modified malicious software, so that instructions can be generated as early as possible to restrict malicious activity being performed in the future by the identified malicious entity or entities 485 in the client processing systems 810.

At step 1650, the method 1600 comprises transferring, from the server processing system 840 to one or more of the plurality of client processing systems 810, instructions to restrict malicious activity being performed by the one or more malicious entities 485. The instructions may be computer executable instructions which can be transferred from the server processing system 840 to the one or more client processing systems 810 which can be executed to quarantine the one or more malicious entities. In one form, this may comprise quarantining the one or more malicious entities 485. In one embodiment, quarantining the one or more malicious entities 485 may comprise removing the one or more malicious entities 485 from the one or more client processing systems 810. In another embodiment, quarantining the one or more malicious entities 485 may comprise modifying the one or more malicious entities 485 in the one or more client processing systems 810. In an additional or alternate form, the modification of the one or more identified entities may comprise injecting executable instructions in the one or more identified entities, or associated entities, in order to at least partially disable the malicious activity.

Figure 17A:
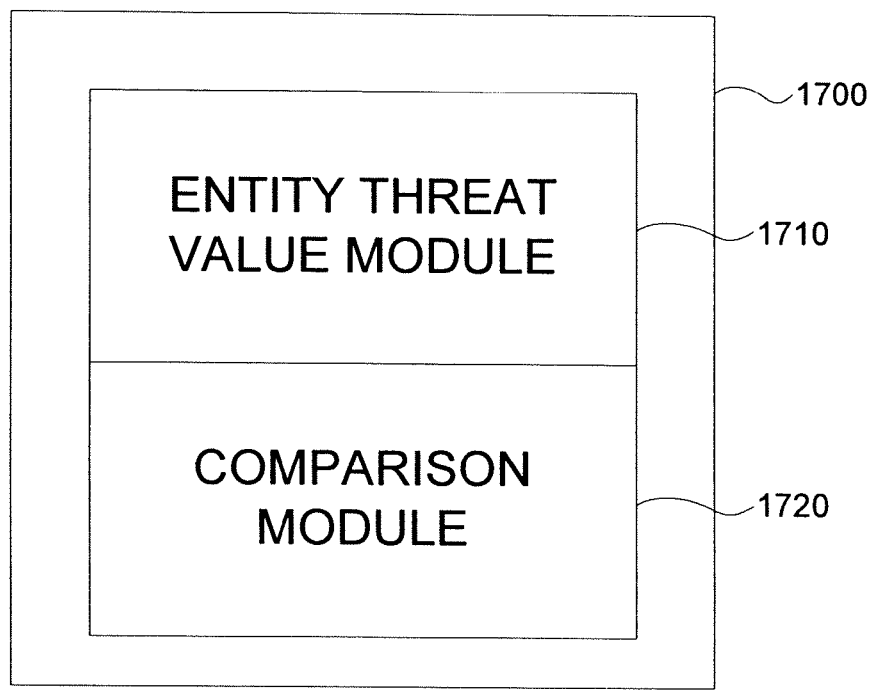
FIG. 17A illustrates a block diagram of an example of a threat assessment module.

Referring to FIG. 17A, there is shown a block diagram illustrating the threat assessment module 1270 which comprises an entity threat value module 1710 configured to determine an entity threat value (ETV) 1790 for an entity 1300. The ETV 1790 is indicative of a level of threat that the entity 1300 represents to the processing system 100. The ETV 1790 is determined based on one or more characteristics 1750 of the entity 1300. The threat assessment module 1270 also comprises a comparison module 1720 configured to compare the ETV 1790 to an entity threat threshold (ETT) 1725 to identify if the entity 1300 is malicious 485.

By identifying malicious entities 485 by calculating a level of threat based on characteristics 1750 of entities 1300 in, or in communication with, the processing system 100, new or modified malicious entities 485 can be identified.

Figure 17B:
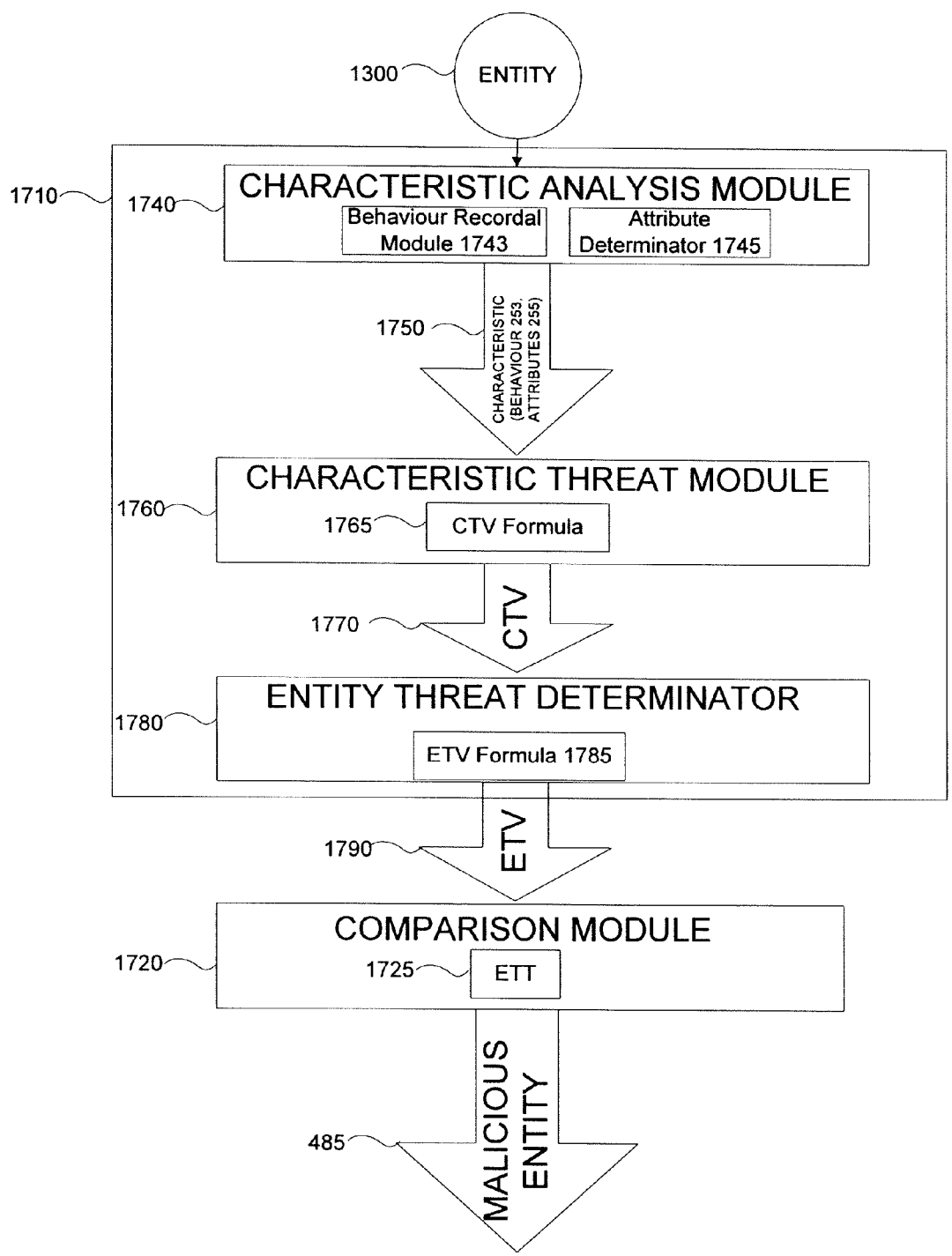
FIG. 17B illustrates a more detailed block diagram of an example of determining an entity threat value to identify a malicious entity.

Referring now to FIG. 17B, there is shown a block diagram illustrating a more detailed example of identifying a malicious entity 485 using the threat analysis module 1270.

In particular, an entity 1300 is passed to the entity threat value module 1710. The entity threat value module 1710 can comprise a characteristic analysis module 1740 which is configured to determine characteristics 1750 of the entity 1300. The characteristic analysis module 1740 can query a behaviour recordal module 1743 and/or an attribute determinator 1745 in order to determine characteristics 1750 of the entity 1300.

The characteristics 1750 of the entity 1300 are then transferred to a characteristic threat module 1760 of the entity threat module 1710. The characteristic threat module 1760 is configured to determine a characteristic threat value (CTV) 1770 for at least some of the characteristics 1750 using a CTV formula 1765.

The characteristic threat module then transfers one or more CTVs to an entity threat determinator 1780 of the entity threat module 1710. The entity threat determinator 1710 comprises an ETV formula 1785. The entity threat determinator 1780 can use the ETV formula 1785 to determine the ETV 1790 for the entity 1300.

The entity threat module 1710 then transfers the ETV 1790 to the comparison module 1720 to determine whether the entity 1300 is a malicious entity 485. The comparison module 1720 comprises an entity threat threshold (ETT) 1725 which is used in comparisons of the ETV 1790 to determine whether the entity 1300 is a malicious entity 485.

Figure 18:
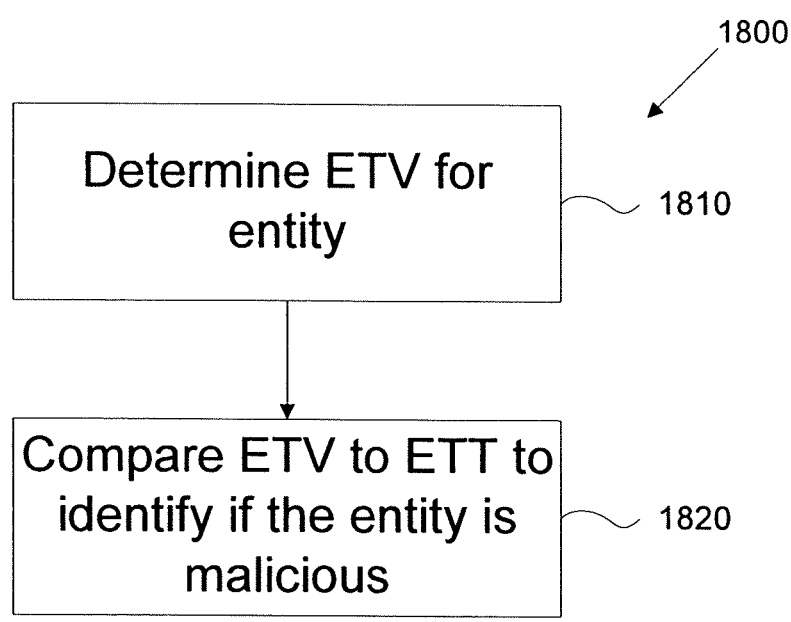
FIG. 18 illustrates a flow diagram representing an example method of identifying a malicious entity using an entity threat value.

Referring to FIG. 18, there is shown an example method 300 to detect malicious entities 299 using the threat analysis module 1270.

In particular, at step 1810, the method 1800 comprises determining the ETV 1790 for the entity 1300 based on the one or more characteristics 1750 of the entity 1300. The characteristics 1750 of the entity 1300 can comprise, but are not limited to, behaviour 1753 of the entity 1300 and/or attributes 1755 of the entity 1300. At step 1820, the method 1800 comprises comparing the ETV 1790 to the ETT 1725 to identify if the entity 1300 is a malicious entity 485.

Figure 19:
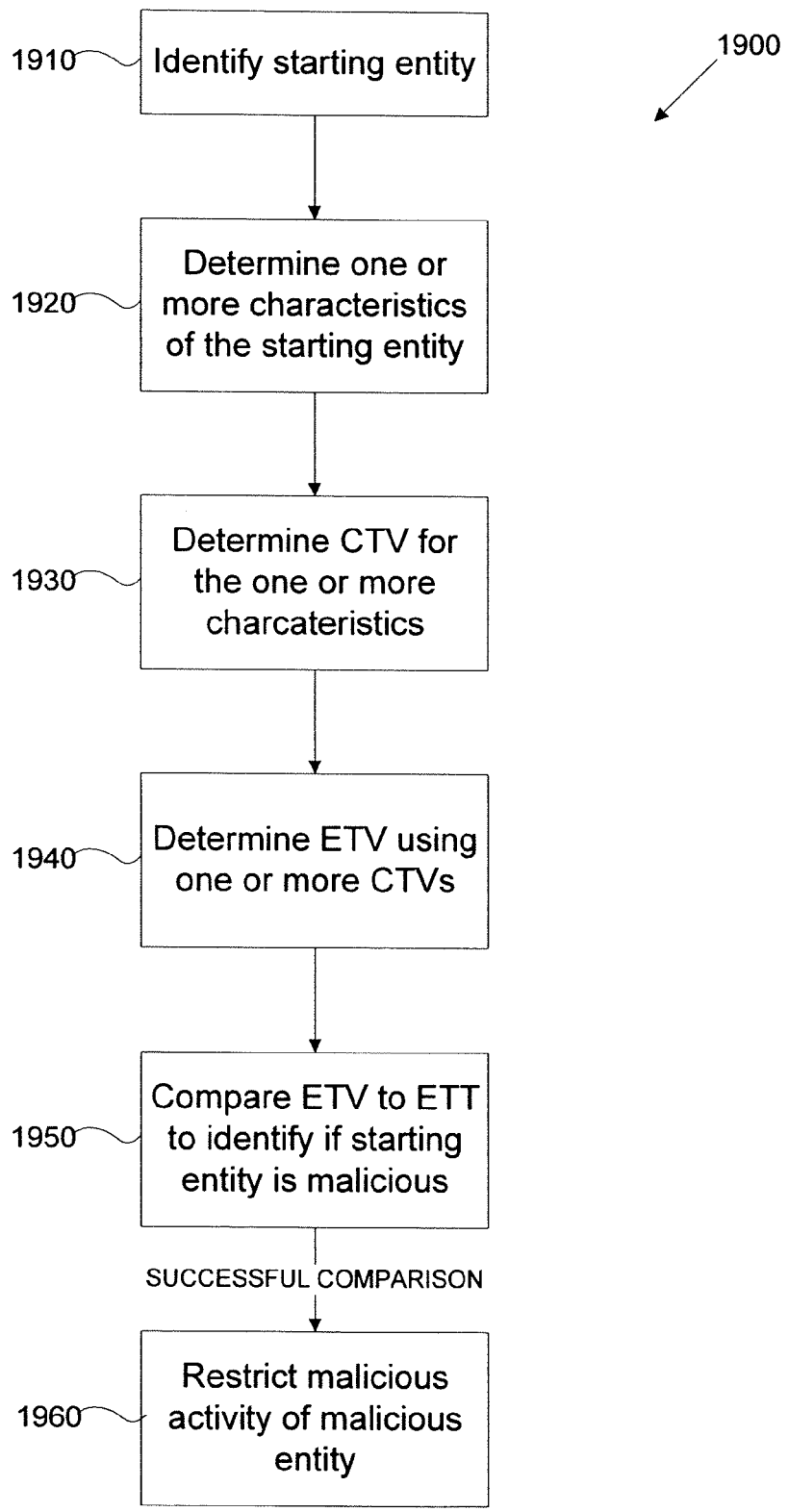
FIG. 19 illustrates a flow diagram representing a more detailed example of the method of FIG. 18.

Referring now to FIG. 19, there is shown a more detailed example of the method of FIG. 18.

In particular, at step 1910, the method 1900 comprises identifying a starting entity 1300 in the processing system 100. The starting entity 1300 is at least one of the target entity 220 and/or the requesting entity 210.

At step 1920, the method 1900 comprises determining one or more characteristics 1750 of the starting entity 1300. The one or more characteristics 1750 of the starting entity 1300 can comprise behaviour 1753 performed by the starting entity 1300, and/or attributes 1755 of the starting entity 1300.

For example, the behaviour 1753 performed by the starting entity 1300 may comprise, but is not limited to, performing self-duplication (ie. the starting entity 1300 making a copy of itself), connecting the processing system 100 to a remote network address, and downloading data from the remote network address. Each of these behaviours 1753 of the entity 1300 is a characteristic of the entity.

The processing system 100 can comprise a behaviour recordal module 1743 which uses API interception to monitor and record behaviours 1753 performed by the processing system 100. The behaviours 1753 can be legitimate and illegitimate behaviours. The behaviour 1753 performed and the entity associated with the behaviour 1753 can be recorded in memory of the processing system 100. In one form the behaviour 1753 and associated entity are recorded in a database. When determining the characteristics 1750 of the starting entity 1300, the database can be queried using the name of the starting entity 1300 to determine behaviours 1753 that have been performed by the starting entity 1300.

In regard to attributes of the starting entity 1300, examples comprise a discrepancy in a checksum for the starting entity, a size of the entity (bytes), a hidden property of the starting entity, and file permissions (ie read, write, execute).

The processing system 100 can comprise an attribute determinator 1745 which, when invoked by the processing system 100, can determine the one or more attributes of the starting entity 1300. For example, the attribute determinator 1745 can determine whether the starting entity 1300 is configured to be hidden in the processing system 100.

At step 1930, the method 1900 comprises determining a characteristic threat value (CTV) 1770 for at least some of the one or more characteristics 1750 of the starting entity 1300.

In one form, at least one of the one or more characteristics 1750 of the starting entity 1300 is associated with a CTV formula 1765. The method 1900 can comprise calculating, using the CTV formula 1765, the CTV 1770.

In one form, a CTV formula 1765 can be configured to assign a constant CTV 1770 for the respective characteristic 1750. For example, if the starting entity 1300 has a hidden property attribute 1755, the associated CTV formula 1765 may be simply a constant value indicative of a level of threat that the hidden property attribute 1755 represents to the processing system 100, as shown below:

CTV=0.3

In additional or alternative forms, CTV formulas 1765 can be configured to use a recorded frequency as an input when calculating the CTV 1770. For example, if the starting entity 1300 has previously caused the processing system 100 to connect to a remote network address on ten instances, the CTV 1770 is adjusted according to the frequency of the behaviour 1753 being recorded in the processing system 100, as shown below:

CTV=0.01×freq=0.01×10=0.1

The frequency may also be determined for a period of time. For example, if the starting entity 1300 connected to the remote network address on ten instances within the past five minutes, then the CTV 1770 is adjusted accordingly for this frequency within this period of time.

In further additional or alternative forms, at least one CTV 1770 is temporally dependent. The CTV formula 1765 can be configured to calculate the CTV 1770 using a temporal value. For example, a starting entity 1300 may have connected to a remote network ten days ago. This period of time is used by the CTV formula 1765 in determining the CTV 1770, as shown below:

$$CTV = 0.1 \times e^{\frac{1}{Time}} = 0.1 \times e^{\frac{1}{10}} = 0.1 \times 1.11 = 0.12$$

In the event that the starting entity 1300 caused the processing system 100 to connect to the remote network address one day ago, the CTV 270 would be calculated as:

$$CTV = 0.1 \times e^{\frac{1}{Time}} = 0.1 \times e^{\frac{1}{1}} = 0.1 \times 2.72 = 0.27$$

As can be seen from the above CTVs 270, the CTV 1770 is adjusted according to how recent the behaviour 1753 was recorded. CTVs 270 can increase or decrease in response to the temporal value used by the CTV formula 1765. Furthermore, the rate at the CTV 1770 increases and decreases may be constant or variable.

As previously discussed, characteristics 1750 can comprise legitimate characteristics indicative of non-malicious activity, and illegitimate characteristics indicative of malicious activity. An example of a legitimate characteristic of a starting entity 1300 comprises having trusted vendor name attribute (ie. a trusted vendor attribute may be "Microsoft Corporation"). An example of an illegitimate characteristic comprises the starting entity having full read, write and execute permissions.

CTVs 1770 for legitimate characteristics and illegitimate characteristics can be calculated using the associated CTV formulas 1765. In one form, illegitimate characteristics have a positive CTV 1770, and illegitimate characteristics have a negative CTV 1770. However, it will be appreciated that this is not essential.

At step 1940, the method 1900 comprises determining the ETV 1790 for the starting entity 1300 using one or more of the CTVs 1770 determined for at least some of the characteristics 1750 of the starting entity 1300.

For example, a starting entity 1300 may have the following CTVs 1770:

CTV1=0.1

CTV2=0.5

CTV3=0.7

CTV4=−0.4

Referring to the above CTVs 1770, four characteristics of the starting entity were determined. Three of the characteristics 1750 are illegitimate (as indicated by the positive CTVs 1770) and one of the characteristics 1750 is legitimate (as indicated by the negative CTV 1770). The ETV 1790 can be determined by summing the CTVs 1770 for the starting entity 1300. In this example the ETV 1790 would be calculated as:

$$ETV = \sum_{x=1}^{4} CTVx = 0.1 + 0.5 + 0.7 - 0.4 = 0.9$$

In instances where the CTV 1770 is not indicative of whether the characteristic 1755 is legitimate or illegitimate, the ETV 1790 can be calculated by determining a difference between the CTVs 1770 for the one or more legitimate characteristics 1750 of the entity 1300, and the CTVs 1770 for the one or more illegitimate characteristics 1750 of the entity 1300, where the difference is indicative of the ETV 1790.

In some instances an ETV 1790 may have been previously calculated for the starting entity 1300 and recorded in the processing system's 100 memory. In this event, the new ETV 1790 can be determined by using the CTVs 1770 and the previously stored ETV 1790.

At step 1950, the method 1900 comprises comparing the ETV 1790 of the starting entity 1300 to the ETT 1725 to determine if the starting entity 1300 is a malicious entity 485. In one form, if the ETV 1790 is greater than or equal to the ETT 1725, the starting entity 1300 is identified as being malicious 485.

For example, the ETT 1725 may be equal to '0.85'. In this instance the ETV 1790 equals '0.9' which is greater than the ETT 1725. Therefore, the starting entity 1300 is identified as being a malicious entity 485.

In another form, the ETV 1790 can be used as an input to a fuzzy logic system, wherein the fuzzy logic system determines whether the starting entity 1300 is considered malicious 485 using the ETV 1790.

At step 1960, the method 1900 comprises restricting the request to perform malicious activity 485. In one form, this may comprise quarantining the malicious entity 485. In another form, this may comprise removing or modifying the malicious entity 485.

Figure 20A:
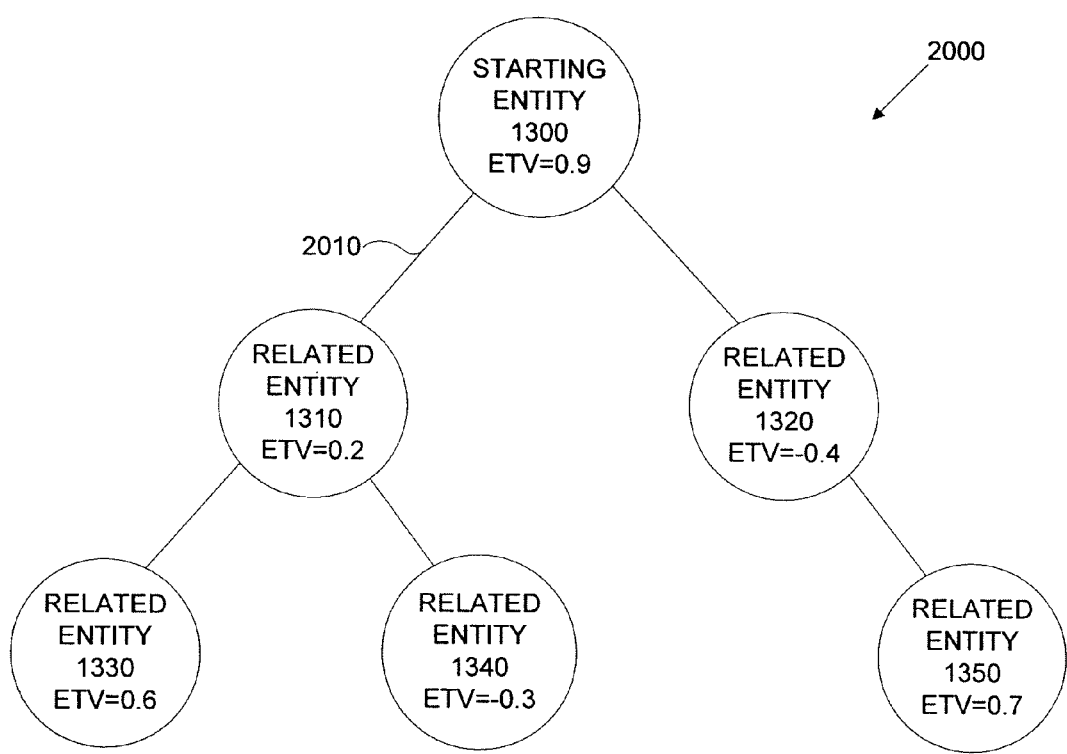
FIG. 20A illustrates a block diagram representing an example group of related entities with associated entity threat values.

Referring now to FIG. 20A, there is shown block diagram illustrating the identification of a malicious entity using the relationship analysis module 1260.

In particular, related entities 2000 can be determined relative to the starting entity 1300. Related entities 2000 may be directly or indirectly related to the starting entity 1300. ETVs 1790 associated with each related entity 1310, 1320, 1330, 1340, 1350 can be used to determine whether the starting entity 1300 is malicious 485. In other forms, the ETVs of the group of related entities 2000 can be used to determine whether at least part of the group 2000 is malicious 485. Each entity is represented as a node. Links 2010 between nodes illustrate the relatedness of the entities. For example, there is a direct link between starting entity 1300 and entity 1310. There is also an indirect link between the starting entity 1300 and entity 1330 via entity 1310.

Once a group of related entities 2000, relative to the starting entity 1300, has been determined, a threat value can be determined based on the group of related entities 2000.

Figure 20B:
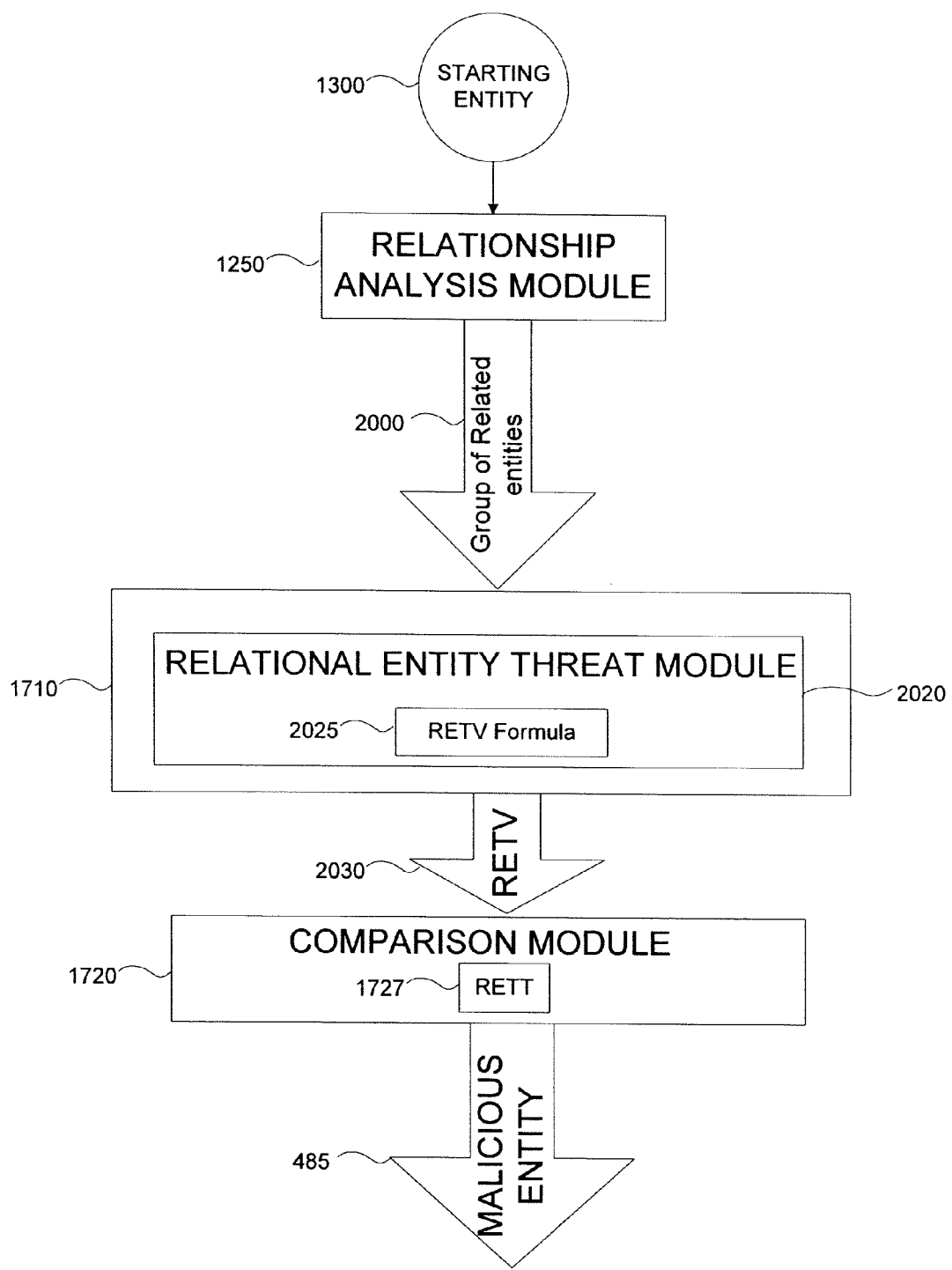
FIG. 20B illustrates a block diagram representing an example process of determining a relational entity threat value to identify a malicious entity.

The threat value for the starting entity 1300 can be calculated based on the related entities 1310, 1320, 1330, 1340, 1350 to the starting entity 1300, as shown in FIG. 20B. This type of threat value which is determined for the starting entity 1300 using the group of related entities 2000 is referred to as a "relational entity threat value" (RETV) 2030. The RETV 2030 can be used to determine whether the starting entity 1300 is malicious to the processing system 100 based additionally upon the related entities 1310, 1320, 1330, 1340, 1350 to the starting entity 1300.

Figure 20C:
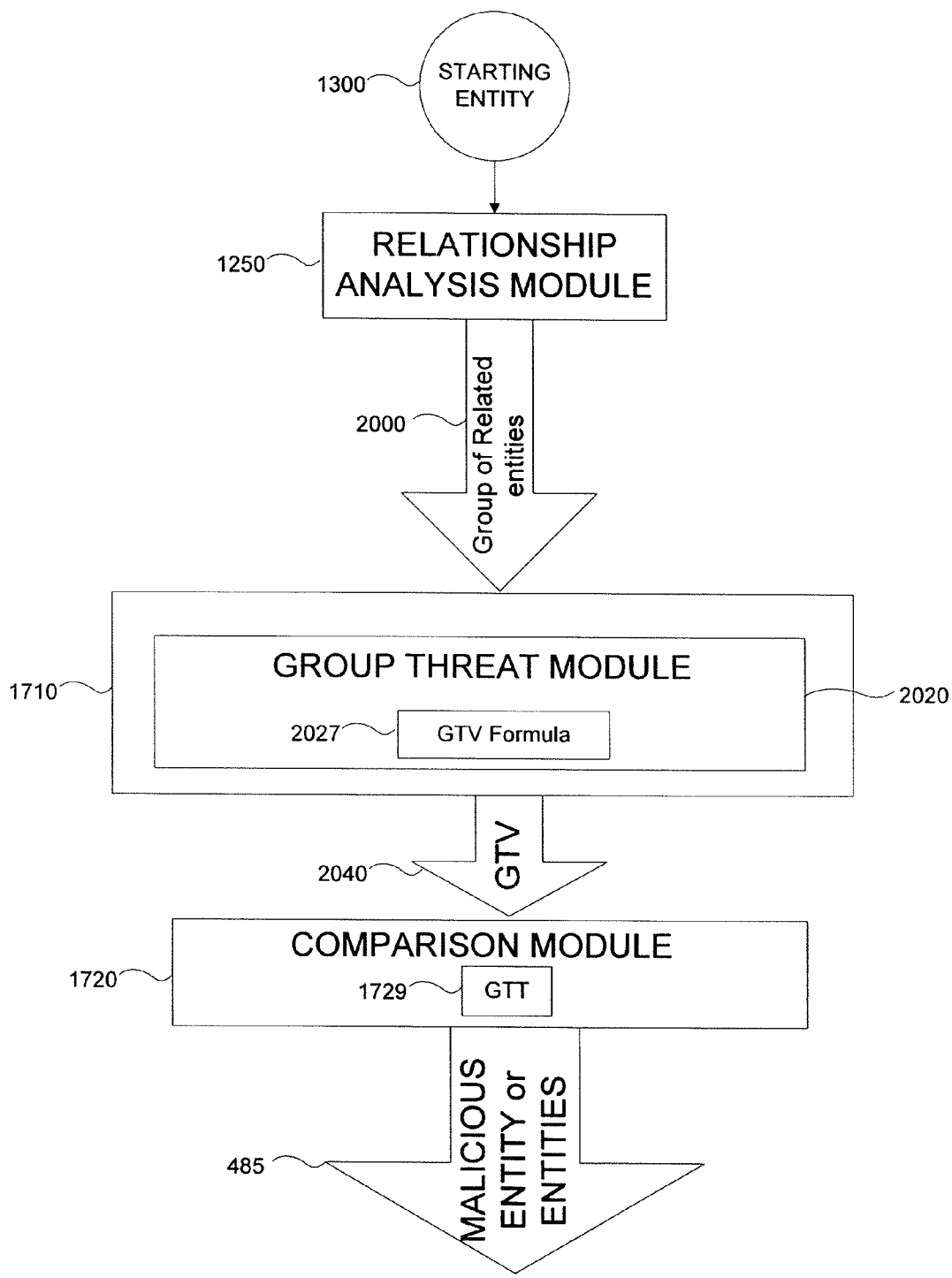
FIG. 20C illustrates a block diagram representing an example process of determining a group threat value to identify one or more malicious entities.

Additionally or alternatively a threat value can be calculated for the group of related entities (which comprises the starting entity) 560 to determine whether the group of related entities 2000 is malicious to the processing system 100, as shown in FIG. 20C. This type of threat value which is determined for the group of related entities 2000 is referred to as a "group threat value" (GTV) 2040. The GTV 2040 can be used to determine whether the group of related entities 2000, or at least a part of the group of related entities 2000, is malicious 485 to the processing system 100.

The RETV 2030 can be calculated by summing the ETVs 1790 for each entity 1300, 1310, 1320, 1330, 1340, 1350 in the group of related entities 2000, and adjusting each ETV 1790 according to the relatedness of the respective related entity 1300, 1310, 1320, 1330, 1340, 1350 relative to the starting entity 1300.

In one form, the number of links 2010 between one of the related entities 1300, 1310, 1320, 1330, 1340, 1350 and the starting entity 1300 can be used as an indicator of the relatedness of the related entity 1300, 1310, 1320, 1330, 1340, 1350. This number of links 2010 between the starting entity 1300 and a related entity 1300, 1310, 1320, 1330, 1340, 1350 in the group 2000 is referred to herein as the "link distance". A related entity which has a direct link (ie. a low link distance) to the starting entity 1300 is given more weight compared to a related entity which has an indirect link (ie. a higher link distance) to the starting entity 1300. The higher the link distance, the less weight is provided for the ETV 1790 of the related entity when calculating the RETV 2030. An example RETV formula 2025 to calculate the RETV 2030 is provided below:

$$RETV = \Sigma ETV \times 0.5^{LinkDist}$$

Where:
LinkDist is the link distance

For example, the RETV 2030 for the group of related entities 2000 illustrated in FIG. 20A would be calculated as:

$$RETV = \Sigma ETV \times 0.5^{LinkDist}$$

$$RETV = 0.9 \times 0.5^0 + (0.2 - 0.4) \times 0.5^1 + (0.6 - 0.3 + 0.7) \times 0.5$$

$$RETV = 0.9 - 0.1 + 0.05 = 0.85$$

The RETV 2030 can then be compared to a relational entity threat threshold (RETT) 1727 to determine whether the starting entity 1300, based on the related entities 1310, 1320, 1330, 1340, 1350 is malicious 485. In this example, the RETT 1727 may be '0.8'. Therefore, the RETV 2030 is greater than RETT 1727, thereby identifying the starting entity 1300 as a malicious entity 485.

Similarly to the process of calculating the RETV 2030, the GTV 2040 can be calculated by summing the ETVs 1790 for each entity 1300, 1310, 1320, 1330, 1340, 1350 in the group of related entities 2000, and then averaging the sum over the number of entities in the group 2000. An example GTV formula 2027 to calculate the GTV 2040 is provided below:

$$GTV = \frac{\sum ETV}{n}$$

where n is the number of entities in the group of related entities 2000

Referring to the group of related entities 2000 shown in FIG. 20A, the GTV 2040 would be calculated as:

$$GTV = \frac{\sum ETV}{n}$$

$$GTV = \frac{0.5 + 0.2 - 0.4 + 0.6 - 0.3 + 0.7}{6}$$

$$GTV = \frac{1.3}{6} = 0.22$$

The GTV 2040 can then be compared to a group threat threshold (GTT) 1729 to determine whether the group of related entities 2000 is malicious 485, or whether at least a portion of the related entities 2000 is malicious 485. In this example, the GTT 1729 may be '0.5'. In this instance, the GTV 2040 is less than the GTT 1729 which indicates that the group of related entities 2000 is not malicious.

Figure 16B:
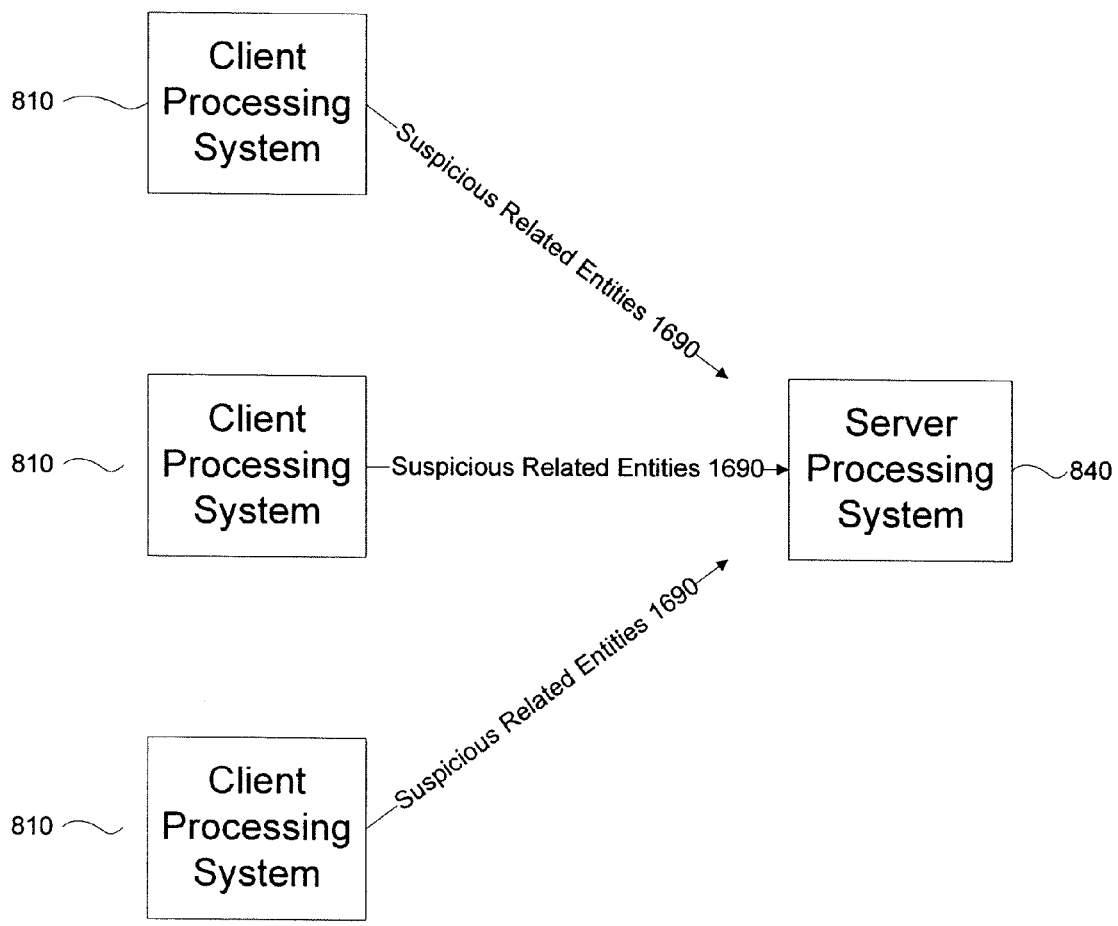
FIG. 16B illustrates a block diagram of an example distributed system for detecting malicious activity.
Figure 21:
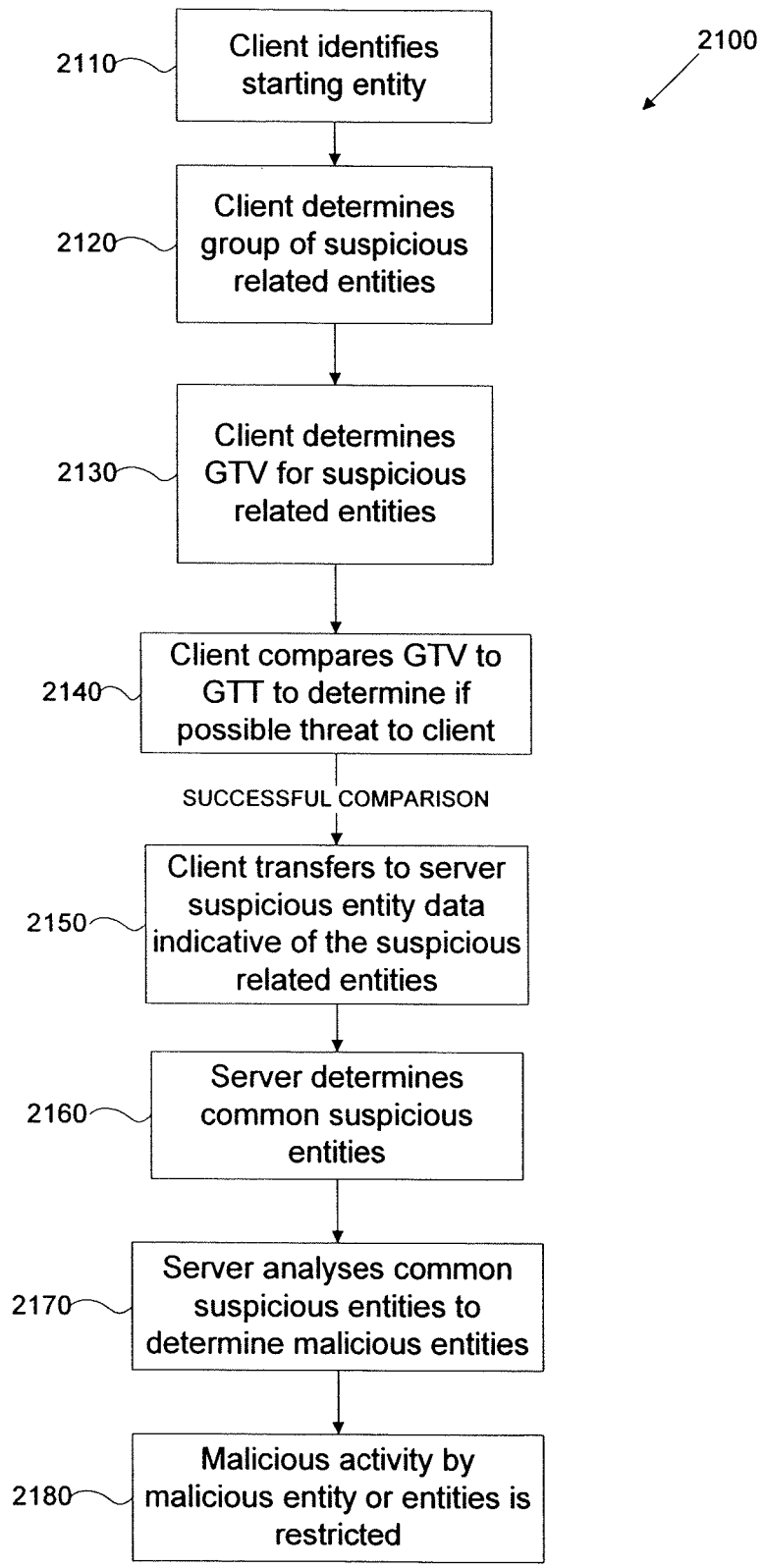
FIG. 21 illustrates a flow diagram of an example method of using a distributed system to detect malicious activity.

Referring now to FIG. 21 there is shown a flow diagram illustrating a method of determining one or more malicious entities using the example system of FIG. 16B.

In particular, at step 2110, the method 2100 comprises identifying a starting entity 500. At step 2120, the method 2100 comprises determining a group of suspicious related entities 2000. At step 2130, the method 2100 comprises determining the GTV 2040 of the group of related entities 2000. At step 2140, the method 2100 comprises comparing the GTV 2040 to the GTT 1729 to determine whether the group of suspicious related entities 2000 represents a possible threat to the client processing system 810.

In the event that the group of suspicious related entities 2000 represents a possible threat to the client processing system 810, the client processing system 810 transfers suspicious related entity data 1690 indicative of the group of suspicious entities 2000 to the server processing system 840 at step 2150. At step 2160, the method 2100 comprises the server processing system 840 determining common suspicious related entities with other records received from other client processing systems 810. At step 2170, the method 2100 comprises the server processing system 840 analysing the common suspicious related entities to determine if one or more of the suspicious related entities is malicious 485. Optionally, at step 2180, the method 2100 comprises restricting malicious activity performed by one or more malicious entities 485.

It will be appreciated from method 2100 that there is a distinction between suspicious and malicious entities. A suspicious entity represents a possible threat to the client processing system 810. A malicious entity 485 represents a threat to the client processing system 710. A more detailed analysis of one or more suspicious entities can be performed at the server processing system 840 such as to determine any malicious entities 485. As the detailed analysis can be performed at a central location such as the server processing system 840, the risk of one of the client processing systems 810 failing to identify a malicious entity 485 due to an outdated dictionary is reduced.

Figure 22:
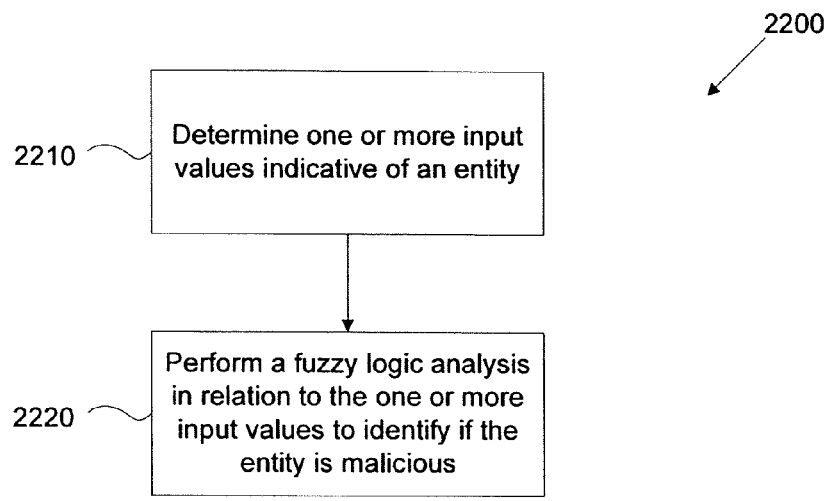
FIG. 22 illustrates a flow diagram of an example method of using fuzzy logic to detect malicious activity.

Referring now to FIG. 22 there is shown a flow diagram illustrating a method of identifying a malicious entity 485 in a processing system 100 using fuzzy logic.

In particular, the method 2200 comprises at step 2210 determining one or more input values 2310 indicative of an entity 1300. At step 2220 the method 2200 comprises performing a fuzzy logic analysis using the one or more input values 2310 to identify if the entity 1300 is malicious 485.

Figure 23:
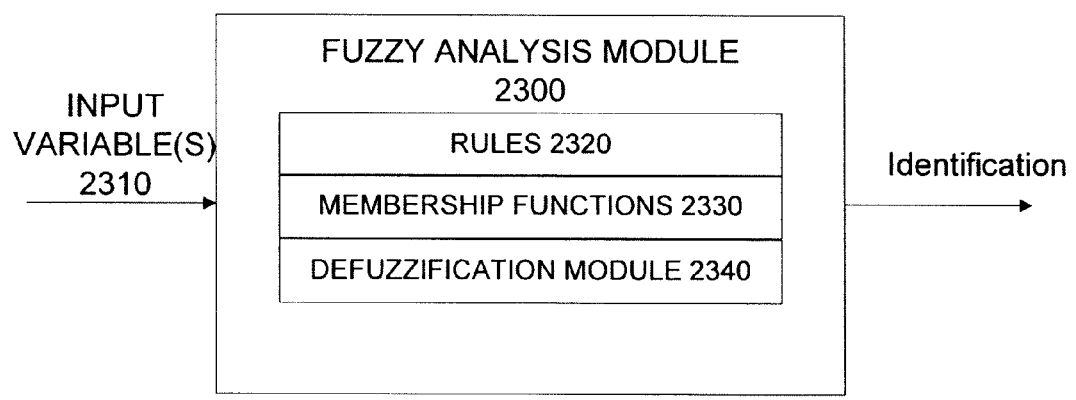
FIG. 23 illustrates a block diagram representing an example of a fuzzy analysis module.

Referring to FIG. 23 there is shown a block diagram illustrating a fuzzy logic module 2300 to perform the fuzzy logic analysis.

In particular, the fuzzy logic module 2300 comprises a set of logic rules 2320, and a number of membership functions 2330. The fuzzy logic module 2300 receives at least one input value 2310 indicative of the entity 1300. The at least one input value 2310 can comprise at least one of: an entity threat value; a group threat value; a frequency of an event occurring; a number of related entities to the entity; and a number of child processes created by the entity. However, it will be appreciated that other input values of the entity can be used to determine whether the entity is malicious.

The fuzzy logic module 2300 is configured to use the at least one input value 2310, the one or more membership functions 2330 and the set of logic rules 2320 to determine an output value. The fuzzy logic module 1100 comprises a defuzzification module 2340 configured to perform a defuzzification process to identify if the entity 1300 is malicious 485.

In additional or alternative forms, the method and system can be adapted to determine a response to the identification as to whether an entity is malicious. For example, possible responses in relation to the entity may comprise: allow the entity to continue functioning in the processing system 100; report the entity to the user of the processing system 100 and optionally the output value; and restrict the entity in the processing system 100.

It will be appreciated that in a networked system, the fuzzy logic module can be located at the client processing system 810, or at the server processing system 840.

An example of a fuzzy logic analysis to identify a malicious entity is shown in FIGS. 24A, 24B 24C, 24D and 24E.

In particular, the input variables are: the number of instances the entity has invoked the processing system 100 to download data from a remote network address in the past twenty four hours 2404; and the number of related entities in relation to the entity 2414. The output is one of the following responses: allow the entity to function in processing system 100 (allow 2421); prompt the user of the processing system 100 about the entity (prompt 2422); and restrict the entity from functioning in the processing system 100 (restrict 2423).

In this example for FIGS. 24A, 24B, 24C, 24D and 24E the frequency 2404 is equal to five instances in the past twenty four hours and the number of related entities 2414 is equal to nine.

Figure 24A:
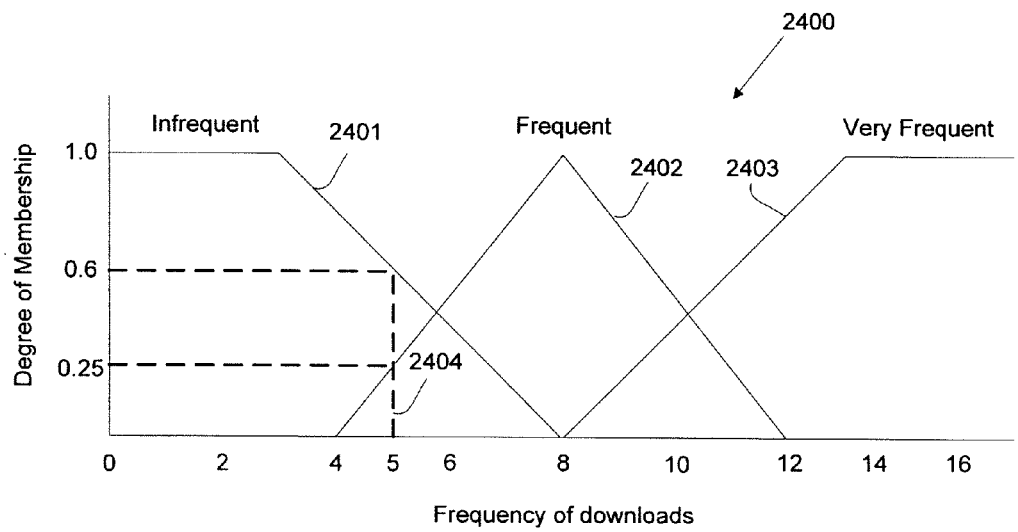
Figure 24B:
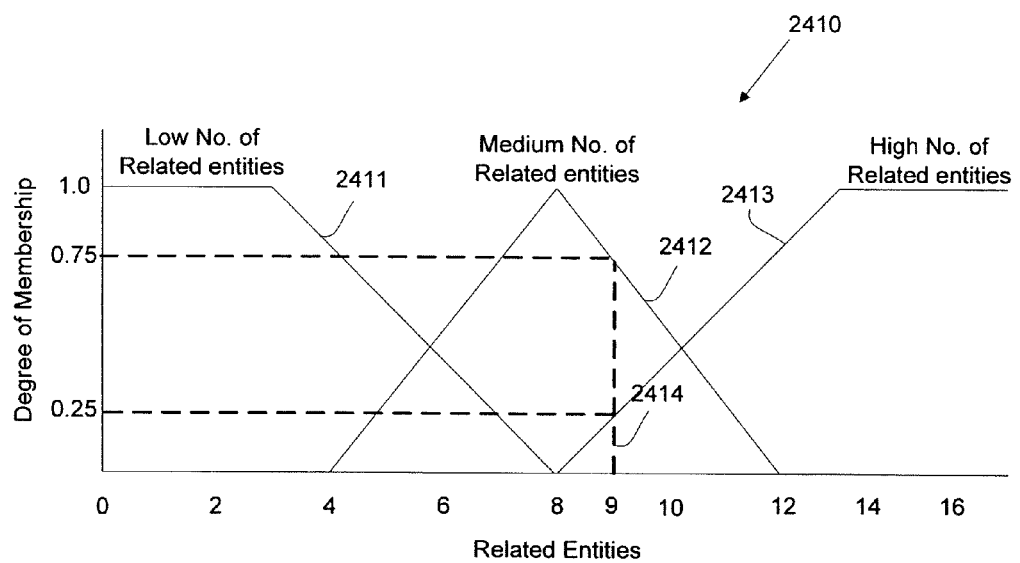

FIGS. 24A and 24B illustrate membership functions 2400, 2410 for the frequency and the number of related entities respectively. The ranges for the membership function 2400 comprise infrequent 2401, frequent 2402, and very frequent 2403. The ranges for the membership function 2410 comprise low number of related entities 2411, medium number of related entities 2412, and high number of related entities 2413. The input values of the frequency of downloads and the number of related entities have been mapped on the horizontal axes of the membership functions comprising intersecting points and corresponding degrees of membership on the vertical axes.

Figure 24C:
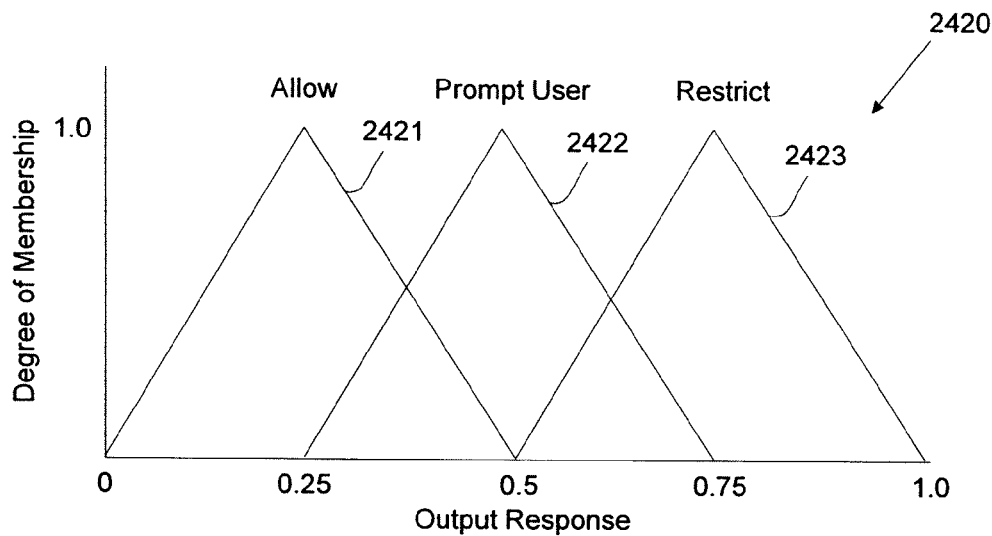

FIG. 24C illustrates an output membership function 2420 which comprises: allowing the entity to function (allow 2421), prompting the user regarding the entity (prompt 2422), and restricting the entity (restrict 2423). It will be appreciated that other forms of output membership functions could be used such as malicious or non-malicious. It will also be appreciated that different shaped membership functions can be used other than those illustrated.

Figure 24D:
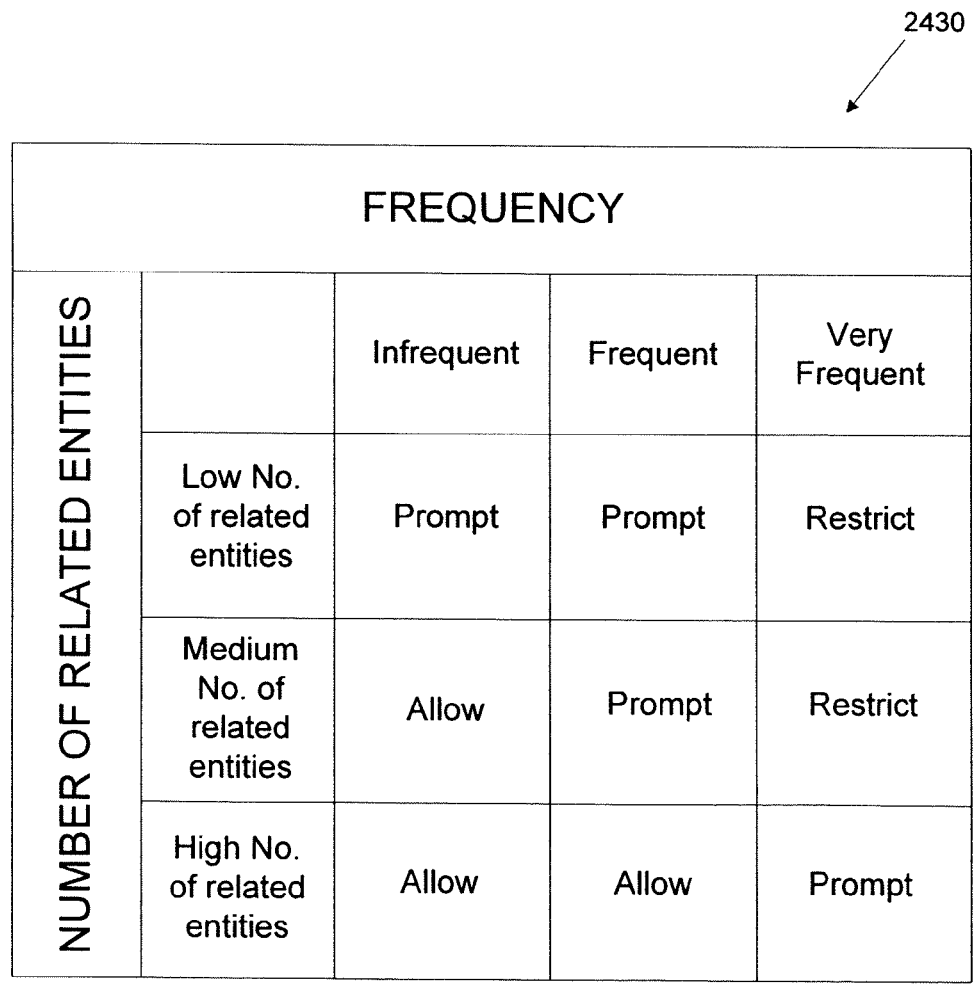

FIG. 24D illustrates a rule matrix 2440 for the respective input values and the associated output results (allow; prompt; restrict) for the specific input values. As illustrated in FIG. 24E, the degree of membership for each input variable has been input into the rule matrix 2430. As will be appreciated by people skilled in the relevant art, a minimum function (logical product) has been applied to the degrees of membership for each combination of input variables to determine a set of fuzzy output response magnitudes. It will be appreciated that other logical operations can be applied, such as logical sum (ie OR).

The fuzzy logic magnitudes are then used in a defuzzification process. In this example a maximum method is used, where the output with the highest fuzzy output response magnitude is selected. In this instance, the "allow" output membership function has a the highest fuzzy output response magnitude equalling '0.6'. In this instance the output is to allow the entity to continue functioning in the processing system 100. It will be appreciated that other methodologies can be used in the defuzzification process such as a centroid method as well as other known methods for performing the defuzzification process.

Optionally, the one or more client processing systems 810 may receive, one or more updated filter rules and/or related entity rules. The one or more client processing systems 810 may receive updated rules from the server processing system 840 or via a data store such as a compact disk or the like. The one or more client processing systems 810 can then update the existing rules with the updated rules.

Optionally, the one or more client processing systems 810 may receive one or more updated formulas. The updated formulas can comprise one or more updated CTV formulas 1765, ETV formulas 1785, RETV formulas 2025 and GTV formulas 2027. Each client processing system 810 can then update the respective formulas.

In another optional form, the one or more client processing systems 810 may receive one or more updated thresholds. The updated thresholds can comprise one or more updated ETT 1725, RETT 1727 and GTT 1729. Each client processing system 810 can then update the respective thresholds.

In one form, statistical processes, fuzzy logic processes and/or heuristical processes can be used in combination with filter rules, the related entity rules and/or the malicious assessment rules to determine whether a rule has been satisfied.

Optionally, the related entities 2000 can be presented to a user of one of the client processing systems. The group of related entities 2000 may be presented in a tabular form or may be presented in a graphical representation. Additionally, the group of related entities 2000 may presented indicating direct or indirect links between entities in the group 2000.

It will be appreciated that although in some of the above examples the server processing system 840 generates the instructions to quarantine the malicious entity associated with the malicious request 485, the one or more client processing systems 810 may alternatively generate the instructions.

Additionally or alternatively, different weighting values may be assigned to different malicious assessment rules. The weighting values may be summed or used in a calculation, and if the result is above a maximum limit, then at least some of the group 2000 is determined to be associated with malicious activity 485.

It is noted that a request which is suspicious 1005 is not always identified as being associated with malicious software 485.

The related entity rules are generally less complex (such as a reduced number of rules) compared to the malicious assessment rules in order to reduce the processing performed by the client processing systems 810. The malicious assessment rules can be used by the server processing system 840 to determine which related 2000 are associated with malicious activity. By using this configuration, the server processing system 840 preferably performs the processing related to determining the malicious entities 485, thus the client processing systems 810 can utilise the processing system resources more effectively.

The embodiments discussed may be implemented separately or in any combination as a software package or component. Such software can then be used to pro-actively notify, restrict, and/or prevent malicious activity being performed. Various embodiments can be implemented for use with the Microsoft Windows operating system or any other modern operating system.

In one optional form, although four types of filter lists 1010, 1020, 1030, 1040 have been herein described for the filter module 1000, these filter lists 1010, 1020, 1030, 1040 can be used separately or in combination.

In another optional form, the user may define user defined filter rules. For example, there may be an activity 230 is the client processing system 810 which is being analysed by the analysis module 480. However, the user is aware that the activity 230 is not associated with malicious activity 485. As such, the user is able to define a user defined rule such as to prevent the request 200 being analysed by the analysis module 480. In one form, user defined filter rules are positioned at the start of the list of filter rules, such that the user defined filter rules are applied first prior to the remaining filter rules.

In another optional form, the analysis module 480 may comprise as activity sequence sub-module which analyses a sequence of activities that occurred prior to and after an identified suspicious activity in a processing system 100. The system may comprise an activity recordal module which records each intercepted event in the processing system 100. When the filter module 1000 identifies an activity which is suspicious, activities which occurred prior to and after the identified suspicious activity can be analysed using the activity sequence sub-module module to determine whether a sequence of activities are indicative of a particular behaviour associated with malicious software.

In one optional form, the suspicious related entities may be used as a form of feedback to adjust the thresholds used by the one or more client processing system 810. For example, if the server processing system 840 determines that ninety percent of suspicious entities are not being determined to be malicious 485, then one or more thresholds may be adjusted so that an optimum level of filtering is obtained. In one form, this optimum level of filtering may be obtained using a fuzzy logic system which determines whether one or more of the thresholds need to be increased or decreased.

Other processes may be used, separately or in combination with the malicious assessment rules, to determine which part of the group is malicious. For example, the method may comprise using a white-list to divide the group into the one or more sub-groups. For example, a group of related entities 2000 may comprise operating system files, and non-operating system files. The method may therefore comprise, using a white-list to separate the group of related entities 2000 into a cluster of operating system files and a cluster of non-operating system files. Based on this separation, it may be determined that the non-operating system files are malicious 485.

In optional forms, a mode of operation of an entity 1300 may be used to weight the ETV 1790, the RETV 2030 or the GTV 2040. For example, an entity 1300 may be operating in an administrative mode when it was recorded connecting to a remote network address. The entity is therefore considered a high threat and therefore the ETV 1790 for the entity 1300 is weighted accordingly to indicate this high risk threat.

In other optional forms, the method of installation for an entity, or installation files associated with an entity, can be analysed to determine one or more characteristics of an entity to allow the identification of a malicious entity. Such analysis may comprise: determining: whether an installation file was automatically executed without user input; whether the installation file is designed to delete itself after execution; whether the installation file is not an executable file; whether the installation file does not create a new sub-directory in the processing system 100; whether the installation file does not install itself in "add and remove wizards" of the operating system; whether the installation file uses hidden or deceptive methods to install the entity, such as using run keys; whether the installation file is configured to install the entity in a directory which comprises a large number of other entities; whether the installation file was not initially downloaded using an Internet browser; whether the installation file does not download ongoing updates using an Internet browser and/or requesting user input; and whether the installation file uses social engineering to install the entity (ie "SCVHOST.exe" instead of "SVCHOST.exe").

Other characteristics 1750 that can be determined regarding an entity 1300 can comprise: where the entity 1300 was downloaded from (ie which country); run-key changes performed by the entity 1300; contents of the entity 1300; whether the entity 1300 creates auto-startup points; the type of packer/compression means used in relation to the entity. Associated CTV formulas can be used to calculate an appropriate CTV indicative of the severity of the threat which the characteristic represents to the processing system 100. For example, if the entity 1300 was downloaded from the US, a small CTV may be calculated which contrasts to an entity which was downloaded from Russia which may result in a large CTV being calculated due to entities being downloaded from Russia being considered to represent a more severe threat to the processing system 100.

The embodiments described throughout can be implemented via hardware, software or a combination of both.

It will be appreciated that the term "malware" has been used in an abbreviated sense for malicious software which comprises many types of processing system threats such as pestware, spyware and other forms of threats as discussed above.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of detecting malicious software, wherein the method comprises:
   recording one or more previously intercepted activities in a list;
   intercepting a request to perform an activity in a processing system;
   determining an entity associated with the activity, wherein the entity comprises at least one of:
   a requesting entity of the activity; and
   a target entity of the activity;
   analysing the entity and the activity to determine if the entity and the activity are associated with malicious software, wherein the entity and the activity are analysed by:
   accessing one or more previously intercepted activities from the list, wherein a determination has not been made as to whether the previously intercepted activities are associated with malicious software;
   comparing the activity and the accessed one or more previously intercepted activities to a sequence of known malicious activities;
   in the event of a positive comparison, determining, in real time, that the entity and the activity are associated with malicious software; and
   in the event that the entity and the activity are determined to be associated with malicious software, restricting the request to perform the activity in the processing system.

2. The method according to claim 1, wherein the method comprises:
   filtering, using a filter module, the activity according to determine if the activity is suspicious; and
   in the event that the activity is determined to be suspicious, performing the analysis to determine if the request is associated with malicious software.

3. The method according to claim 2, wherein the filter module comprises a list of filter rules to determine if at least one of the target entity and the requesting entity are suspicious or non-suspicious, wherein the method comprises:
   determining an order of the list according to a frequency of instances each filter rule has been previously satisfied, wherein the filter module is used at least partially based on the determined order.

4. The method according to claim 2, wherein the filter module comprises a list of susceptible target entity filter rules, wherein the step of determining if the activity is suspicious comprises determining if the target entity satisfies one of the susceptible target entity filter rules, and in response to one of the susceptible target entity filter rules being satisfied, the activity is identified as being suspicious.

5. The method according to claim 2, wherein the filter module comprises a list of non-susceptible target entity filter rules, wherein the step of determining if the activity is non-suspicious comprises determining if the target entity satisfies one of the non-susceptible target entity filter rules, and in response to one of the non-susceptible target entity filter rules being satisfied, the activity is identified as being non-suspicious.

6. The method according claim 2, wherein the filter module comprises a list of non-trusted requesting entity filter rules, wherein the step of determining if the activity is suspicious comprises determining if the requesting entity satisfies one of the non-trusted requesting entity filter rules, and in response to one of the non-trusted requesting entity filter rules being satisfied, the activity is identified as being suspicious.

7. The method according to claim 2, wherein the filter module comprises a list of trusted requesting entity filter rules, wherein the step of determining if the activity is non-suspicious comprises determining if the requesting entity satisfies one of the non-trusted requesting entity filter rules, and in response to one of the non-trusted requesting entity filter rules being satisfied, the activity is identified as being non-suspicious.

8. The method according to claim 1, wherein analysing the activity comprises:
   determining an entity threat value for the entity, the entity threat value being indicative of a level of threat that the entity represents to the processing system, wherein the entity threat value is determined based on one or more characteristics of the entity; and comparing the entity threat value to an entity threat threshold determine if the request is associated with malicious software.

9. The method according to claim 8, wherein each of the one or more characteristics of the entity is associated with a respective characteristic threat value, wherein the method comprises calculating the entity threat value using at least some of the characteristic threat values for the one or more characteristics of the entity.

10. The method according to claim 8, wherein the method comprises:

determining one or more related entities to the entity, wherein each related entity has an associated entity threat value; and, calculating the entity threat value for the entity using the entity threat value for at least some of the one or more related entities.

11. The method according to claim 8, wherein the method comprises:

determining one or more related entities to the entity, wherein each related entity has an associated entity threat value; and, calculating a group threat value for the entity and one or more related entities using the entity threat value for at least some of the one or more related entities and the entity.

12. The method according to claim 1, wherein analysing the activity comprises:

determining one or more values indicative of an entity; and performing a fuzzy logic analysis in relation to the one or more values to determine if the request is associated with malicious software.

13. The method according to claim 12, wherein the one or more values can comprise at least one of:

an entity threat value;

a group threat value;

a frequency of an event occurring;

a number of related entities to the entity; and a number of child processes created by the entity.

14. A system to detect malicious software, wherein the system is configured to:

record one or more previously intercepted activities in a list;

intercept a request to perform an activity in a processing system;

determine at least one of:

a requesting entity of the activity; and a target entity of the activity;

analyse at least one of the requesting entity, the target entity and the activity to determine if the entity and the activity are associated with malicious software, wherein the system is configured to:

access one or more previously intercepted activities from the list, wherein a determination has not been made as to whether the previously intercepted activities are associated with malicious software;

compare the activity and the accessed one or more previously intercepted activities to a sequence of known malicious activities;

in the event of a positive comparison, determine, in real time, that the entity and the activity are associated with malicious software; and restrict the request to perform the activity in the processing system in the event that the entity and the activity are determined to be associated with malicious software.

15. A computer program product comprising a non-transitory computer readable medium having a computer program recorded therein or thereon, the computer program enabling detection of malicious software, wherein the computer program product configures the processing system to:

record one or more previously intercepted activities in a list;

intercept a request to perform an activity in a processing system;

determine at least one of:

a requesting entity of the activity; and a target entity of the activity;

analyse at least one of the requesting entity, the target entity and the activity to determine if the entity and the activity are associated with malicious software, wherein the computer program product configures the processing system to:

access one or more previously intercepted activities from the list, wherein a determination has not been made as to whether the previously intercepted activities are associated with malicious software;

compare the activity and the accessed one or more previously intercepted activities to a sequence of known malicious activities;

in the event of a positive comparison, determine, in real time, that the entity and the activity are associated with malicious software; and restrict the request to perform the activity in the processing system in the event that the entity and the activity are determined to be associated with malicious software.

* * * * *